US008819545B2

(12) United States Patent
Nonaka

(10) Patent No.: US 8,819,545 B2
(45) Date of Patent: Aug. 26, 2014

(54) DIGITAL COMIC EDITOR, METHOD AND NON-TRANSITORY COMPUTER-READABLE MEDIUM

(71) Applicant: FUJIFILM Corporation, Tokyo (JP)

(72) Inventor: Shunichiro Nonaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 123 days.

(21) Appl. No.: 13/655,549

(22) Filed: Oct. 19, 2012

(65) Prior Publication Data

US 2013/0104015 A1    Apr. 25, 2013

(30) Foreign Application Priority Data

Oct. 21, 2011   (JP) ................................. 2011-232153

(51) Int. Cl.
*G06F 17/00*    (2006.01)
(52) U.S. Cl.
USPC ......................................................... 715/247
(58) Field of Classification Search
USPC .................. 715/243, 244, 245, 246, 247, 273
See application file for complete search history.

(56) References Cited

U.S. PATENT DOCUMENTS

| 5,748,199 | A * | 5/1998 | Palm ............................... 345/473 |
| 7,898,685 | B2 * | 3/2011 | Onishi .......................... 358/1.18 |
| 8,549,403 | B2 * | 10/2013 | Sitrick ........................... 715/716 |
| 2001/0013046 | A1 * | 8/2001 | Katayama et al. ............ 707/530 |
| 2007/0143269 | A1 * | 6/2007 | Ando et al. ........................ 707/3 |
| 2009/0041352 | A1 * | 2/2009 | Okamoto ....................... 382/176 |
| 2011/0107220 | A1 * | 5/2011 | Perlman ......................... 715/720 |
| 2012/0180083 | A1 * | 7/2012 | Marcus ............................ 725/32 |
| 2012/0290950 | A1 * | 11/2012 | Rapaport et al. .............. 715/753 |
| 2013/0031479 | A1 * | 1/2013 | Flowers ......................... 715/716 |
| 2013/0247083 | A1 * | 9/2013 | Impollonia et al. ............. 725/14 |
| 2013/0304604 | A1 * | 11/2013 | Hoffman et al. ............. 705/26.5 |

FOREIGN PATENT DOCUMENTS

| JP | 2004-078923 A | 3/2004 |
| JP | 2008-084348 A | 4/2008 |
| JP | 2010-129068 A | 6/2010 |

* cited by examiner

*Primary Examiner* — Laurie Ries
(74) *Attorney, Agent, or Firm* — McGinn IP Law Group, PLLC

(57) ABSTRACT

A digital comic editor, comprising: a data acquisition device acquiring a piece of master data of a digital comic, the master data including: an image file corresponding to each page of the comic, the image file having a high resolution image of the entire page; and an information file corresponding to each page or all pages of the comic, the information file having a piece of frame information including a piece of frame region information of each frame within the page; a display control device controlling display device to display an image thereon based on the image file in the master data acquired and to display a frame boundary while superimposing the same on the image based on the frame region information included in the information file in the master data; an indication device indicating a position on the image displayed on the display device; a frame addition device adding a new frame boundary to a position indicated; a frame deletion device that deletes the frame boundary from the position indicated; and an editing device updating the frame region information included in the information file based on the frame boundary added or the frame boundary deleted.

20 Claims, 27 Drawing Sheets

FIG.4

DIGITAL COMIC EDITOR, METHOD AND NON-TRANSITORY COMPUTER-READABLE MEDIUM

BACKGROUND OF THE INVENTION

1. Field of the Invention

The present invention relates to a digital comic editor, a method and a non-transitory computer-readable medium, particularly relates to an art to digitize comic contents.

2. Description of the Related Art

Japanese Patent Application Laid-Open No. 2004-78923 discloses a comics editing support device which detects frame borders based on substantially closed line segments in a digital comic image. Japanese Patent Application Laid-Open No. 2004-78923 also discloses that, when a user specifies a certain line segment, a frame border which includes the line segment is detected.

Japanese Patent Application Laid-Open No. 2010-129068 discloses an image group editing device which automatically determines borders of frames from an original comic. Japanese Patent Application Laid-Open No. 2010-129068 also discloses that various data such as frame border position, expansion/reduction ratio and scroll setting are stored and are used for additional editing on the original comic or for automatic format conversion for a mobile phone.

Japanese Patent Application Laid-Open No. 2008-84348 discloses a comic creation supporting apparatus which modifies frame allotment by shifting a frame or changing the size and/or shape of a frame.

SUMMARY OF THE INVENTION

However, the inventions disclosed in Japanese Patent Application Laid-Open No. 2004-78923 and Japanese Patent Application Laid-Open No. 2010-129068 have a problem that the automatically detected frame border cannot be edited. For example, when the automatically detected frame border is different from the frame border of the original content, the frame border cannot be edited so as to conform to the frame border of the original content.

Although the invention of Japanese Patent Application Laid-Open No. 2008-84348 discloses a concept of modification of the frame border, it does not disclose the case and method of frame border modification. Also, the invention of Japanese Patent Application Laid-Open No. 2008-84348 discloses a technique to modify the frame border generated by the comic creation supporting apparatus but is not a technique used for digitizing a comic content.

The present invention has been proposed in view of the above circumstances. An object of the invention is to provide a digital comic editor, a method and a non-transitory computer-readable medium capable of, when digitizing a comic content, checking a result of an automatically detected frame and easily editing the detection result of the frame based on the checked result.

To achieve the above object, a digital comic editor according to an aspect of the invention includes: a data acquisition device configured to acquire a piece of master data of a digital comic, the master data including: an image file corresponding to each page of the comic, the image file having a high resolution image of the entire page; and an information file corresponding to each page or all pages of the comic, the information file having described therein a piece of frame information including a piece of frame region information of each frame within the page; a display control device configured to control display device to display an image thereon based on the image file in the master data acquired by the data acquisition device and to display a frame boundary while superimposing the same on the image based on the frame region information included in the information file in the master data; an indication device configured to indicate a position on the image displayed on the display device; a frame addition device configured to add a new frame boundary to a position indicated by the indication device; a frame deletion device configured to delete the frame boundary from the position indicated by the indication device; and an editing device configured to update the frame region information included in the information file based on the frame boundary added by the frame addition device or the frame boundary deleted by the frame deletion device.

According to the aspect of the invention, the master data of the digital comic can be appropriately edited. The master data includes the image file corresponding to each page of the comic, which has a high resolution image of the entire page; and the information file corresponding to each page or all pages of the comic, which has described therein a piece of frame information including a piece of frame region information of each frame within the page. Particularly, a detection result of a frame is modified by adding or deleting a frame boundary partitioning the frames within the page. With this, the frame region information included in the information file can be edited (updated). That is, an editor is allowed to check present frame region information (frame allotment) by looking at the frame boundary which is displayed being superimposed on the image displayed on the display device. When performing editing to add or delete a frame, an indication to add a new frame boundary at a position indicated by the indication device, or an indication to delete a frame boundary at a position indicated by the indication device is given; thereby the frame boundary can be easily added or deleted. The frame region information included in the information file can be updated based on the added or deleted frame boundary.

The digital comic editor according to another aspect of the invention preferably further includes a frame boundary extraction device configured to, when an arbitrary position on the image is indicated by the indication device, automatically extracts a frame boundary candidate adjacent to the indicated position, wherein the display control device controls to display the frame boundary candidate extracted by the frame boundary extraction device on the image in a manner distinguishable from other frame boundaries. The frame boundary extraction device is configured to automatically detect a frame boundary candidate (for example, a part of linear portion) adjacent to a position indicated by the indication device from the image. The display control device is configured to display the frame boundary candidate extracted by the frame boundary extraction device on the image in a manner distinguishable from other frame boundaries. With this, a frame boundary can be added with a simple operation.

In the digital comic editor according to yet another aspect of the invention, the frame region information on the frame is a piece of coordinate data of each vertex on the polygonal frame boundary enclosing the frame, a piece of vector data representing the frame boundary or a piece of mask data representing frame region of each frame.

In the digital comic editor according to yet another aspect of the invention, the frame addition device is configured to add the coordinate data of a vertex at a position on the frame boundary indicated by the indication device.

In the digital comic editor according to yet another aspect of the invention, the frame deletion device is configured to delete the coordinate data of a vertex from the frame boundary indicated by the indication device.

The digital comic editor according to yet another aspect of the invention preferably further includes a frame boundary modification device configured to receive an indication input to modify the position or shape of the frame boundary indicated by the indication device and modifies the frame boundary in accordance with the received indication input, wherein the editing device is configured to update the frame region information included in the information file with the frame boundary modified by the frame boundary modification device. With this, not only the addition and deletion of the frame but also size and shape of the frame can be edited.

In the digital comic editor according to yet another aspect of the invention, the frame information preferably includes a piece of frame order information representing read order of the frames within the page, and the display control device is configured to display a frame order representing read order of the frames while superimposing the same on each frame on the image based on the frame order information. With this, an editor can check if the frame order information included in the frame information is proper.

In the digital comic editor according to yet another aspect of the invention, when a frame is added by the frame addition device or when a frame is deleted by the frame deletion device, the editing device preferably edits the frame order information based on the addition or deletion of the frame. The editing device is configured so as, when the frame is added or deleted and frame order is changed due to the editing, to automatically edit the frame order information.

The digital comic editor according to yet another aspect of the invention preferably further includes a frame order modification device configured to receive an indication input to modify the frame order of the frame indicated by the indication device and modifies the frame order information in accordance with the received indication input. With this, when the frame order information is not proper, the frame order information can be modified.

The digital comic editor according to yet another aspect of the invention further includes: an image acquisition device configured to acquires an image file having a high resolution image of the entire page; frame region extraction device that analyzes the image of the entire page acquired by the image acquisition device and automatically extracts the frame regions of the frames within the page; an information file creation device configured to create the information file described with a piece of frame information including a piece of frame region information representing a frame region extracted by the frame region extraction device; and master data creation device configured to create the master data of the digital comic, the master data including an image file of each page of the comic acquired by the image acquisition device and an information file corresponding to each page or all pages of the comic created by the information file creation device, wherein the data acquisition device is configured to acquire the master data created by the master data creation device.

If all the pieces of frame information are entered manually, the work results in an enormous amount. However, the master data can be created efficiently by automatically creating the master data. When the master data is automatically created, some erroneous frame information may be described in the information file. However, according to the invention, the erroneous frame information can be easily modified.

In the digital comic editor according to yet another aspect of the invention, when a frame boundary is indicated by the indication device, the display control device preferably controls to display the indicated frame boundary in a manner distinguishable from other frame boundaries. With this, the frame boundary to be edited can be easily checked.

A digital comic editing method according to yet another aspect of the invention includes the steps of: a data acquisition step acquiring a piece of master data of a digital comic, the master data including: an image file corresponding to each page of the comic, the image file having a high resolution image of the entire page; and an information file corresponding to each page or all pages of the comic, the information file having described therein a piece of frame information including a piece of frame region information of each frame within the page; a display control step controlling display device to display an image thereon based on the image file in the master data acquired by the data acquisition step and to display a frame boundary while superimposing the same on the image based on the frame region information included in the information file in the master data; an indication step indicating a position on the image displayed on the display device; a frame addition step adding a new frame boundary to a position indicated in the indication step; a frame deletion step deleting the frame boundary from the position indicated in the indication step; and an editing step updating the frame region information included in the information file based on the frame added in the frame addition step or the frame deleted in the frame deletion device.

A non-transitory computer-readable medium storing a digital comic editing program according to yet another aspect of the invention causes a computer to execute: a data acquisition step to acquire a piece of master data of a digital comic, the master data including: an image file corresponding to each page of the comic, the image file having a high resolution image of the entire page; and an information file corresponding to each page or all pages of the comic, the information file having described therein a piece of frame information including a piece of frame region information of each frame within the page; a display control step to control a display device to display an image thereon based on the image file in the master data acquired by the data acquisition step and to display a frame boundary while superimposing the same on the image based on the frame region information included in the information file in the master data; an indication step to indicate a position on the image displayed on the display device; a frame addition step to add a new frame boundary to a position indicated by the indication step; a frame deletion step to delete the frame boundary from the position indicated by the indication step; and an editing step to update the frame region information included in the information file based on the frame added by the frame addition step or the frame deleted by the frame deletion step.

According to the invention, when digitizing a comic content, an automatic detection result of frames can be checked, and based on the check result, the detection result of frames can be easily edited.

BRIEF DESCRIPTION OF THE DRAWINGS

FIG. 4 illustrates an example of a monitor display;

DETAILED DESCRIPTION OF THE PREFERRED EMBODIMENTS

Embodiments of a digital comic editor, a method and a non-transitory computer-readable medium according to the invention will be described below referring to the appended drawings.

[Configuration of a Content Delivery System]

Figure 1:
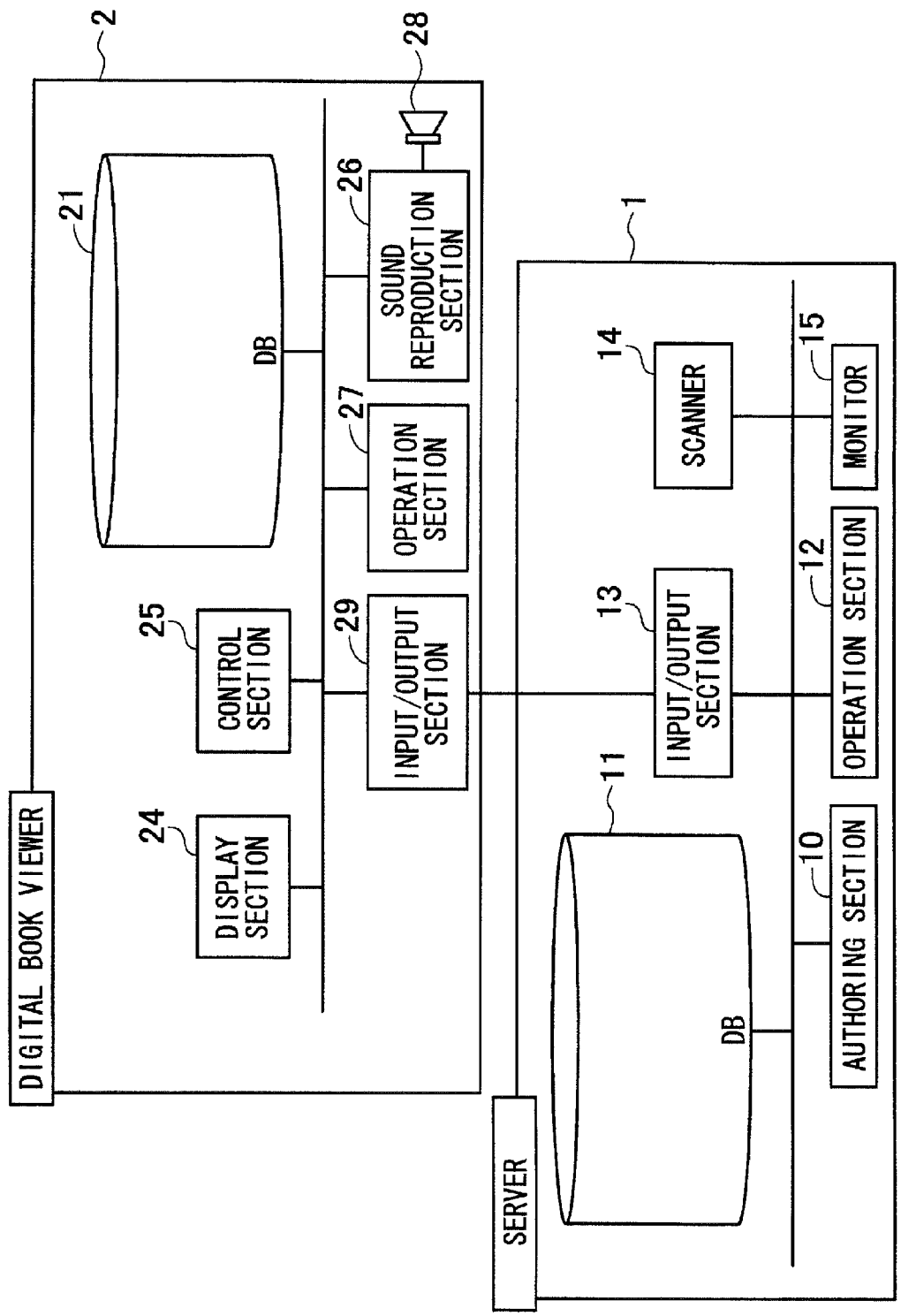
FIG. 1 illustrates a configuration of a content delivery system according to the invention.

FIG. 1 illustrates a configuration of a content delivery system according to a preferred embodiment of the invention. The system includes a server 1 and a digital book viewer 2. The server 1 is configured of a computer (information processor) including a processor (CPU), a storage, I/O circuits and the like.

The digital book viewer 2 is an information terminal including a display device capable of reproducing images, communication device, a processor (CPU), a storage, I/O circuits, an operation device, a sound reproduction device capable of reproducing sounds and the like. For example, the digital book viewer 2 is constituted of a smartphone or a tablet computer. Unspecified number of digital book viewers 2 may access to the server 1.

In particular, the server 1 includes an authoring section 10, a database (DB) 11, an operation section 12, an input/output section 13, a scanner 14, and a monitor 15.

The authoring section 10 includes an information processor such as CPU and a storage storing a digital comic editing program or the like to perform various information processing in accordance with the digital comic editing program. The DB 11 is constituted of a storage medium such as a hard disk and a memory and the like. The operation section 12 includes the operation device such as a keyboard, a mouse, a touch-pad and the like. The monitor 15 is the display device constituted of a display device such as an LCD.

The authoring section 10 analyzes a content image to create several pieces of collateral information such as page information, frame information, coordinates of speech bubble, ROI information and the like, and creates a piece of master data for digital book, in which these pieces of data are associated with each other. Also, the authoring section 10 creates a piece of data optimized for each digital book viewer 2 from the master data. Detailed description of the authoring section 10 will be given later.

The DB 11 accumulates content files for storing the content image associated with a page number and collateral information thereof in a predetermined file format. The content images are original contents which are the data digitalized using the scanner 14 or the like. The original contents include comics, newspapers, articles of magazines, office documents (presentation documents, etc), textbooks, reference books, which are set on the page basis. Also, each set of the content images is associated with its own page number.

The content images and the collateral information thereof are stored in an EPUB format. The content images may include their collateral information. The collateral information may include author of content, title, total number of pages, volume number, episode number, a holder of the right of publication (publisher) and the like.

The content image includes outline images and detailed images (high resolution data), and each image is prepared on the basis of page, frame or anchor point.

The collateral information collateral to the content image includes information input from the operation section 12, information of result of analysis made by the authoring section 10, or information input through the input/output section 13.

The digital book viewer 2 is constituted of a portable information terminal such as a smartphone or a tablet computer and includes a display device capable of reproducing images, a communication device, an operation detection device, a sound reproduction device, an information processor and the like.

In particular, the digital book viewer 2 includes a database (DB) 21, a display section 24, a content display control section 25, a sound reproduction section 26, an operation section 27, a speaker 28, and an input/output section 29.

The display section 24 is the display device including a display device such as an LCD. The operation section 27 is the operation detection device including a touch panel or the like. The operation section 27 is preferably laminated on the display section 24, and is capable of detecting various operations on the display section 24 such as single tap, double tap, swipe, long press or the like.

The sound reproduction section 26 is a circuit that converts sound-related information (information relevant to read sound and/or information relevant to accompanying sound) stored in the content file into sounds to outputs the same from the speaker 28.

The input/output section 29 is a device that inputs a content file output from the input/output section 13 of the server 1. Typically, the input/output section 13 and the input/output section 29 is the communication device, but it may be a write/read device for a computer readable storage medium.

The DB 21 stores information same as the DB 11. That is, when the digital book viewer 2 makes a request to the server 1 to transmit a digital book, the server 1 exports a content file from the DB 11 to the DB 21 via the input/output section 29, and the content file is stored in the DB 21. However, the information in the DB 11 and the information in the DB 21 may not be completely identical to each other. The DB 11 is a library that stores various kinds of content images, for example, content images of each volume of comics of different authors in order to meet the requests from various kinds of users. The DB 21 stores at least content files relevant to the contents that a user of the digital book viewer 2 desires to browse.

The content display control section 25 controls the display of contents on the display section 24.

[Operation of the Content Delivery System]

(A) Creation Processing of Master Data

Figure 2:
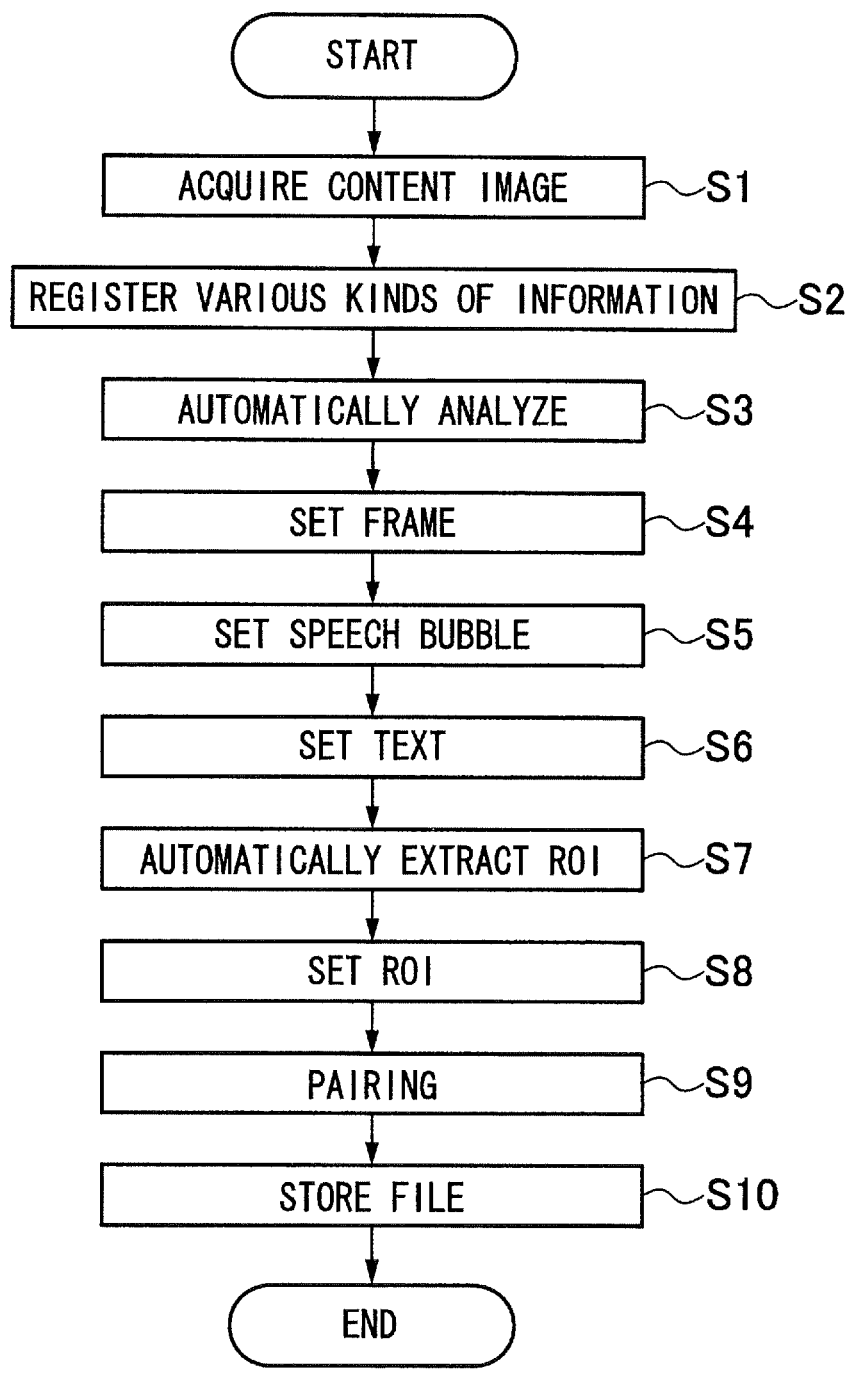
FIG. 2 is a flow chart of master data creation.

FIG. 2 is a flow chart illustrating the processing flow in which the authoring section 10 creates a piece of master data.

The authoring section 10 acquires a content image (step S1). The acquired image is stored in the DB 11. The server 1 acquires images of the entire page corresponding to the respective pages of the comic (high resolution images of 3000×5000 pixels or 1500×2000 pixels) via a storage media or a network; or acquires images by reading the comic by the scanner 14. The authoring section 10 acquires content images acquired by the server 1 in the above manner. When the content image is already stored in the DB 11, the authoring section 10 may acquire the content image stored in the DB 11.

In step S1, the authoring section 10 causes the monitor 15 to display the content image acquired in step S1 on a registration screen which is a screen for registering various kinds of information. When the user inputs various kinds of information through the operation section 12 in accordance with the instruction on the registration screen, the authoring section 10 acquires and registers the information in the DB 11 while associating the content image (step S2). The authoring section 10 creates an information file and stores the various kinds of information in the information file. The authoring section 10 makes a connection between the content image and the information file with each other to create a piece of master data. The master data is temporarily stored in the DB 11. As for the format of the information file, for example, an XML file is available.

The various kinds of information (page information) includes several pieces of information relevant to the content (content unique title ID, title name, author, publisher (holder of the right of publication), publication year, language and the like), a piece of information relevant to the page, page name, a piece of information of page ID. The information relevant to the page device a piece of information indicating whether the content image is a single page or a two-page spread, right-open/left-open, size of original content.

Figure 3:
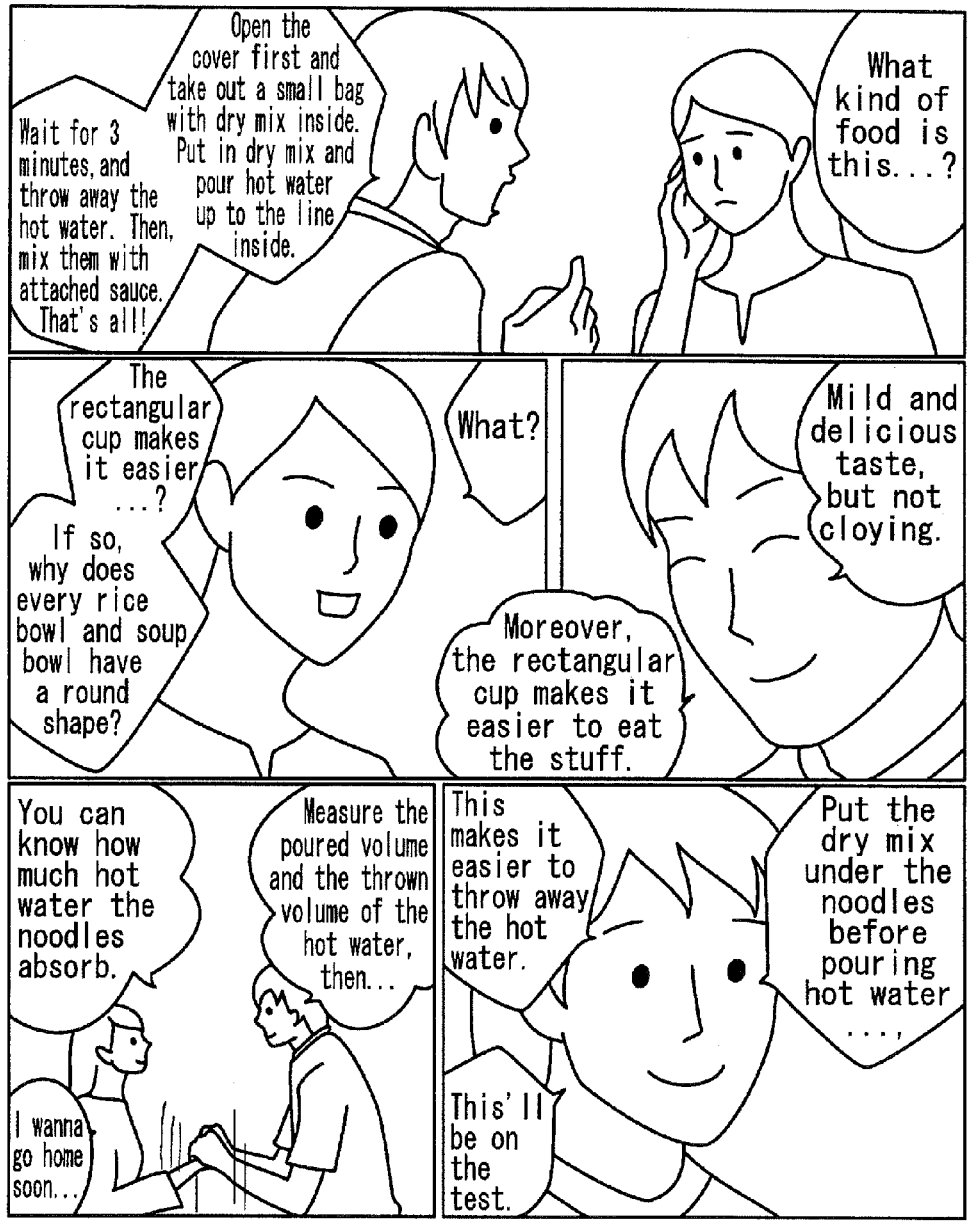
FIG. 3 illustrates an example of a content image.
Figure 4:
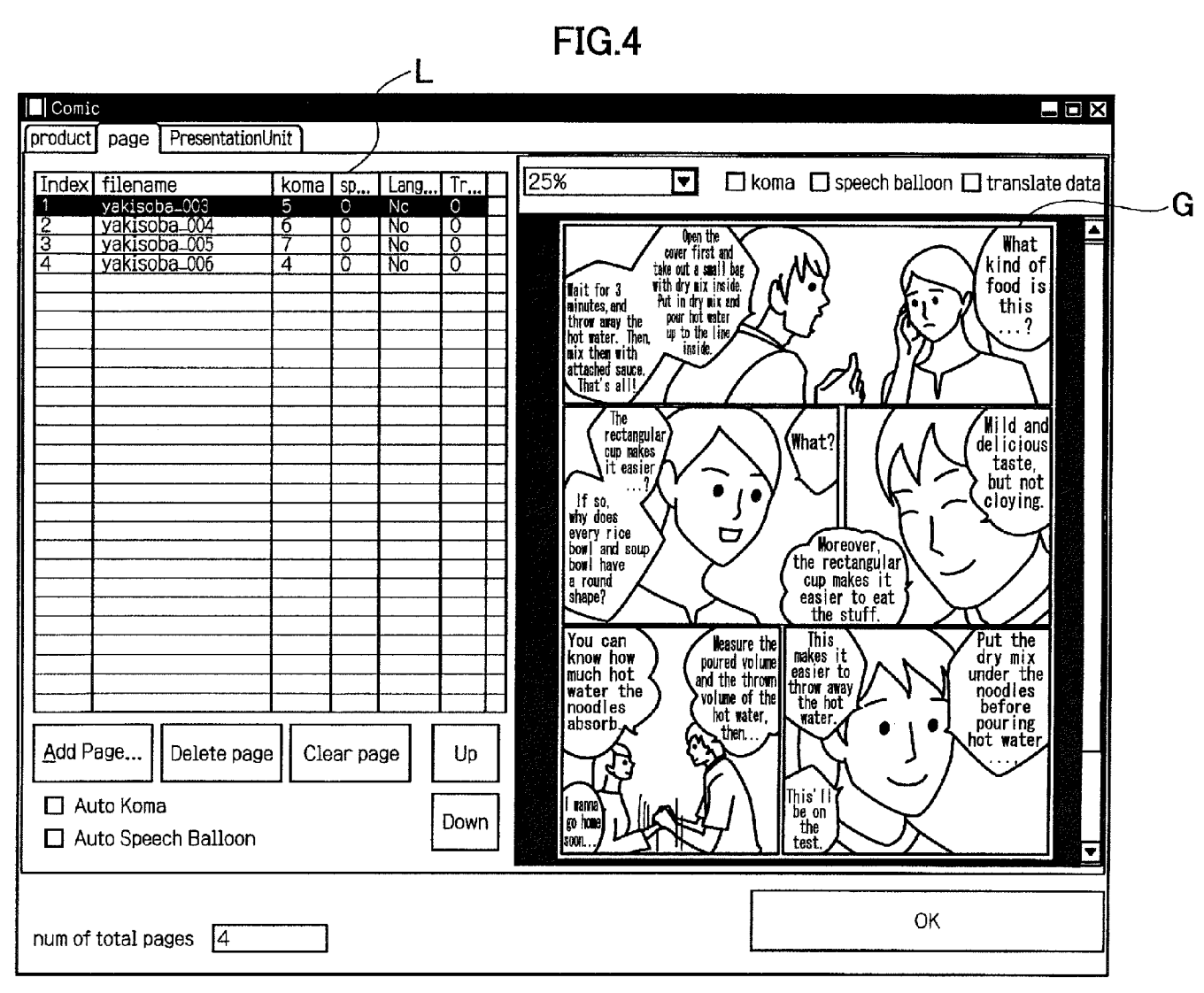

When a content image shown in FIG. 3 is acquired in step S1, the authoring section 10 displays a registration screen shown in FIG. 4 on the monitor 15. On the registration screen, a content image G is displayed at the right hand; and a list L of the acquired content images is displayed at the left hand. "Index" is a file ID which is automatically given to the acquired content image. In the list L, plural pieces of information of the acquired content images are displayed in the order of file IDs. Before registration, "0" is displayed in the columns other than "Index".

When the user makes an input operation on any column of "filename", "speaking", "Language" and "Translation" through the operation section 12, the authoring section 10 displays the input character information in the list L and stores the same in the DB 11. "filename" means a file name; "speaking" indicates existence of sound information; "Language" indicates a language of the character information included in the content image; "Translation" indicates existence of translation into other languages of the character information included in the content image. "koma" indicates number of the frames, at this point, "0" is displayed (automatically input later).

The authoring section 10 automatically analyzes the content image (step S3). The automatic analysis is executed when the user checks (select) a check box of "Auto Koma" and/or "Auto Speech Balloon" and presses OK button A through the operation section 12 in the registration screen shown in FIG. 4. In this embodiment, a description is made assuming that "Auto Koma" and "Auto Speech Balloon" are selected.

When "Auto Koma" is selected, the authoring section 10 automatically detects frames based on information on the lines included in the content image. The information on the lines included in the content image is acquired by, for example, by recognizing a portion in which a region having a stronger contrast in the content image appears linearly as a line.

When "Auto Speech Balloon" is selected, the authoring section 10 extracts a text from the content image and determines a closed region enclosing the periphery of the text as a speech bubble region; thereby a speech bubble included in the content image is extracted. An optical character reader (OCR) included in the authoring section 10 extracts the text. The text read by the OCR is sorted based on the orientation of the characters. For example, when the words run vertically, the words are sorted from the top to the end of the line and from a line at the right toward the line at the left.

The frame detection and the speech bubble extraction may be performed based on machine learning. For example, detection accuracy of the frame and outer edge of the speech bubble, a determination threshold of adequateness of the frame region other than rectangle and the speech bubble may be empirically set based on a learning sample comic.

The information file stores a piece of frame information on the frame, a piece of speech bubble information on the speech bubble, and a piece of text information on the text.

The frame information includes a piece of frame region information. The frame region information is a piece of information indicating a frame region which includes the number of the frames included in the page, coordinates of vertexes of each frame and a shape of each frame. The frame region information may be a piece of vector data indicating a frame boundary line or a piece of mask data indicating a frame region. The frame information further includes a piece of frame order information or the like relevant to the frame order (reproduction order) of each frame. An appropriate pattern of frame order is selected from some transition patterns of frame order such as, for example, from top right to bottom left, or from top left to bottom right of the page, and a shift direction (horizontal direction or vertical direction) or the like based on a piece of information on right-open/left-open page, a piece of information on content representing a language, a frame allocation detected from the frame region information and the like. Thus, frame order is automatically determined in accordance with the selected transition pattern.

The speech bubble information includes a piece of speech bubble region information. The speech bubble region information is a piece of information indicating regions where speech bubbles exist within a page unit (or frame unit), which includes a piece of position information (for example, coordinates) of plural points corresponding to a speech bubble shape on a line, a shape of the speech bubble (for example, vector information), position and direction of a start point of a speech bubble (vertex of speech bubble), and a size of the speech bubble. The speech bubble region information may be a piece of bitmap information (mask data) indicating a full region (range) of the speech bubble. The speech bubble region information may be represented by a specific position (center position) of the speech bubble and the size of the speech bubble. The speech bubble information further includes, a piece of information on a text included in the speech bubble, an attribute of the line of the speech bubble (dotted line, solid line etc), an ID information of a speaker of the speech bubble, and a frame to which the speech bubble belongs.

The text information includes a piece of text region information and a piece of information on the content of the text. The text region information includes a piece of position information of plural points corresponding to the text region on the line (for example, coordinates), a piece of vector information indicating outer periphery edge of the text region. The text region information may be a piece of bitmap information (mask data) indicating a text region (range). The information on the content of the text includes a piece of text (sentence) character attribute information specified by the OCR, number of lines, line spacing, character spacing, display switching method, language, vertical writing/horizontal writing, differentiation of reading direction and the like. The character attribute information includes a character size (the number of points etc) and character classification (font, highlighted character etc). The text information includes a dialog of a speaker in the speech bubble. The text information also includes a translation sentence and the language of various languages (translation sentences of 2 or more languages are available) corresponding to original dialog disposed in the speech bubble.

The authoring section 10 stores a piece of information in which the text and the speech bubble are associated with each other and a piece of information in which the speech bubble or text and the frame are associated with each other in an information file. Since the text is extracted during the extraction of the speech bubble, the text is associated with the speech bubble from which the text is extracted. By comparing the coordinates included in the speech bubble information with the coordinates included in the frame information, it is determined in which frame the speech bubble included. Thus, the speech bubble is associated with a frame in which the speech bubble is included. When no closed region is found around a text, it is a case when only the characters are included in the frame. Thus, the text is associated with a frame in which the text is included.

The authoring section 10 updates the master data by storing the frame information, the speech bubble information and the text information in the information file. When all of the processing of the step is made manually, enormous workload is required. By automatically performing the processing as described above, the master data is created efficiently.

The authoring section 10 displays the original content image and the detection result of the frame of the content image which is automatically analyzed in step S3 on the monitor 15 next to each other, receives a correction input of the frame detection result through the operation section 12, and performs frame setting based on the result (step S4).

Figure 5:
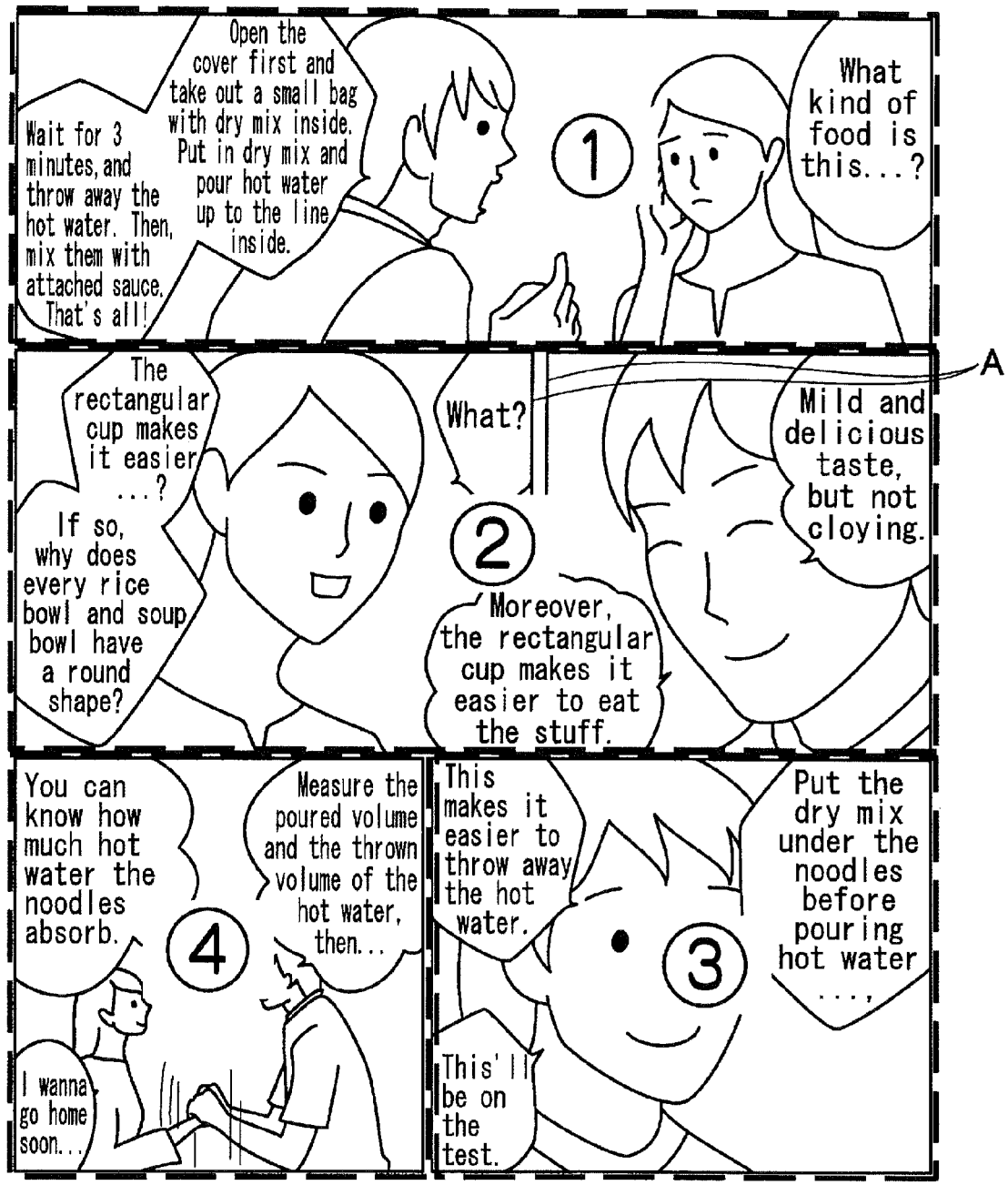
FIG. 5 illustrates a result of frames which are automatically detected from a content image.

The processing in step S4 is described in detail. FIG. 5 illustrates a frame detection result by the automatic analysis of a content image (file ID: 1, file name: yakisoba_003) shown in FIG. 3. Actually, the content image shown in FIG. 3 and the frame detection result shown in FIG. 5 are displayed on the monitor 15 next to each other. However, only the frame detection result shown in FIG. 5 may be displayed. The authoring section 10 displays the frame detection result based on the information file. The frame detection result is displayed with a thick dotted line with boundary line of each frame (hereinafter, referred to as frame boundary line) being overlapped with the contrast image; and in the center of each frame, a frame order indicating the reading order of the frame is displayed. With this, the user can check the present frame region information (frame allocation) and frame order.

When a predetermined frame is selected by the user, the authoring section 10 changes the color of the frame boundary of the frame to a color different from the color of other frame boundary line (for example, selected frame is red line; unselected frame is blue line), and starts to receive a correction input to a selected frame. With this, the user can check the frame to be edited.

(1) Increasing Frames

In a state a frame is selected, when a certain position in the frame is selected, the authoring section 10 adds a frame boundary line adjacent to the selected position, and accompanying this, updates the frame order. In step S3, although a line is extracted and recognized, if the line cannot be recognized as a frame boundary line, an erroneous recognition is caused. When a certain position in the frame is selected, the authoring section 10 extracts a line adjacent to the position at which a selection instruction is input which is recognized as a line, but is not recognized as a frame boundary line, a new frame boundary line is added by recognizing the line as a frame boundary line.

Figure 6:
FIG. 6 illustrates a modification result of the frame detection result shown in FIG. 5.

In the frame detection result shown in FIG. 5, in the frame order 2 at the center of the content image, although actually two frames exist, they are recognizes as a single frame. Therefore, when the user selects a point adjacent to lines A at the center of the frames through the operation section 12, the authoring section 10 divides the frame at the center of the content image into a frame of frame order 2 and a frame of frame order 3 as shown in FIG. 6.

Accompanying the increase of the frames, the authoring section 10 modifies the frame order. In this case, the frame order 3 of the frame in FIG. 5 is changed to 4, and the frame order 4 in FIG. 5 is changed to 5.

(2) Deleting Frame

Figure 7:
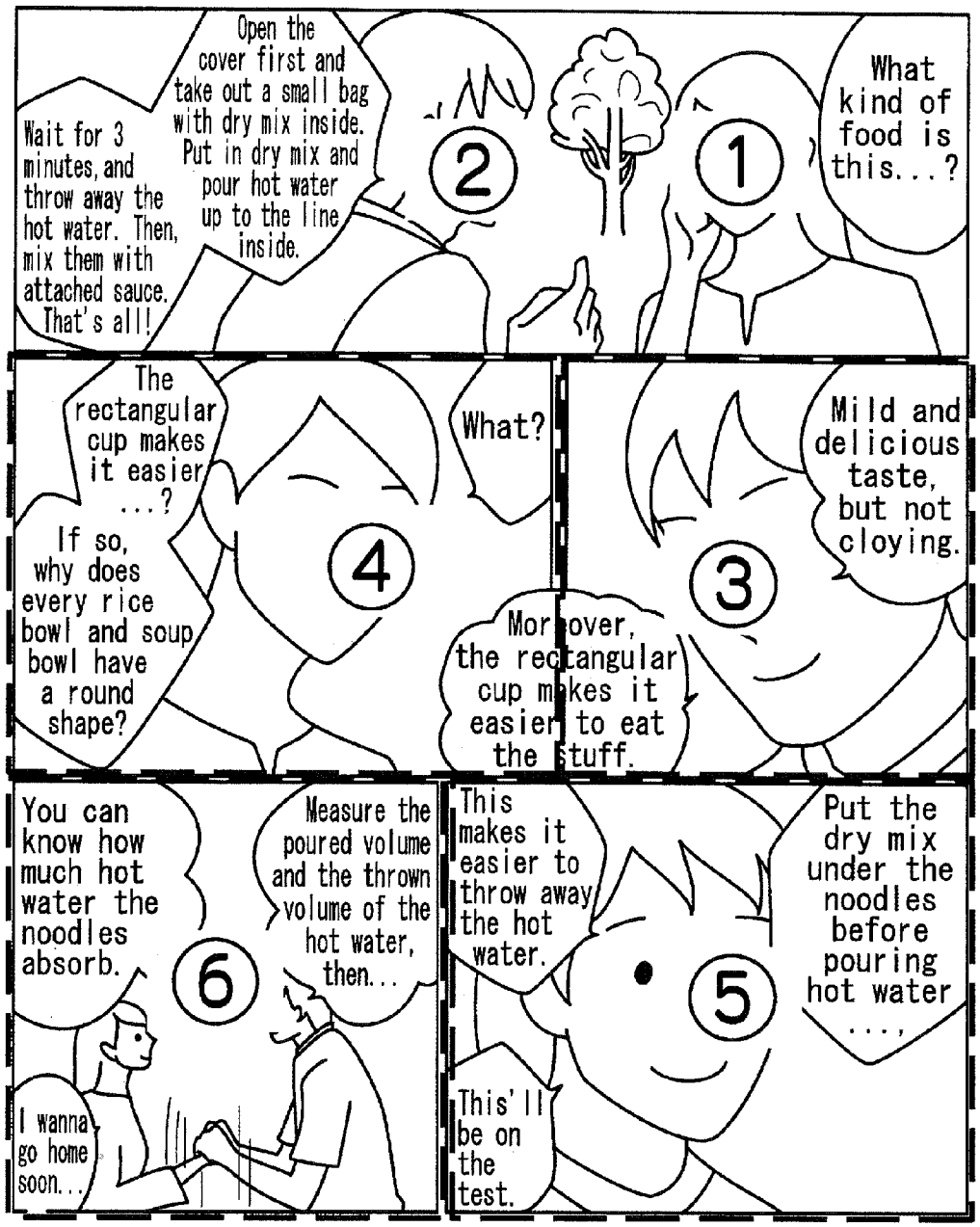
FIG. 7 illustrates a result of frames which are automatically detected from the content image.
Figure 8:
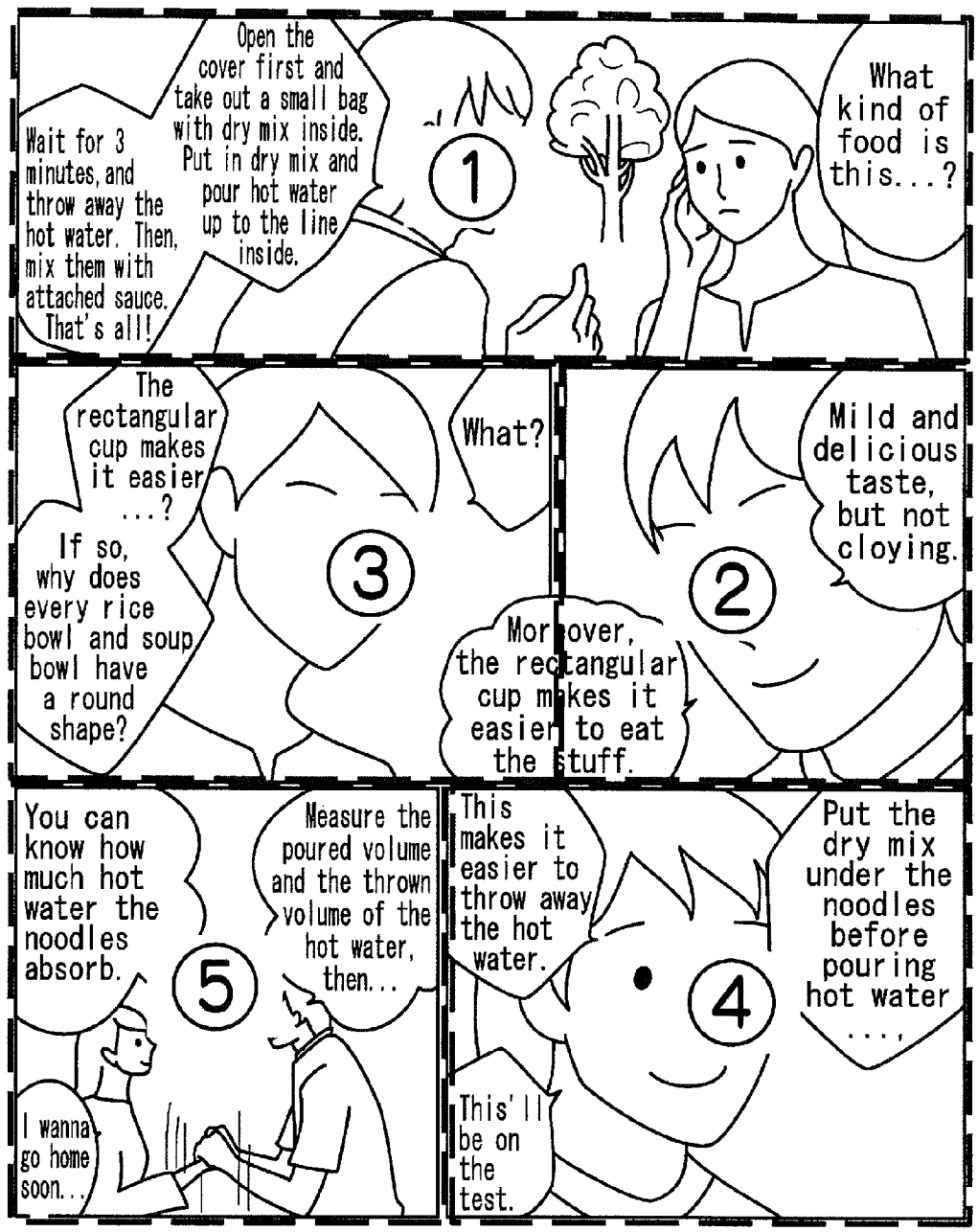
FIG. 8 illustrates a modification result of the frame detection result shown in FIG. 7.

In an example shown in FIG. 7, as a result of false recognition that a trunk of a tree B is a line dividing the frame, although the upper portion of the content image is divided into two, actually, the upper frame of the content image is a single frame. An image shown in FIG. 7 is displayed on the monitor 15, in a state that the frame with frame order 1 or the frame with frame order 2 is selected, when the user selects the frame boundary line between the frame with frame order 1 and the frame with frame order 2 through the operation section 12, the authoring section 10 deletes the frame boundary line between the frame with frame order 1 and the frame with frame order 2 in FIG. 7, and modifies the upper frames of the content image into a single frame with frame order 1 as shown in FIG. 8.

Accompanying the deletion of the frame, the authoring section 10 modifies the frame order. In this case, the frame order 3 in FIG. 7 is changed to 2; the frame order 4 is changed to 3; and the frame order 6 is changed to 4.

When adding or deleting the frame boundary line, the added frame boundary line and the frame boundary line to be deleted may be displayed to distinguishable from other frame boundary lines. With this, the user can recognize which frame boundary line is added and which frame boundary line is deleted.

(3) Modification of Frame Boundary Line

When selected frame is double-clicked, the authoring section 10 receives correction input of the number of vertexes and coordinates. With this, shape and size of frame can be modified.

Figure 9:
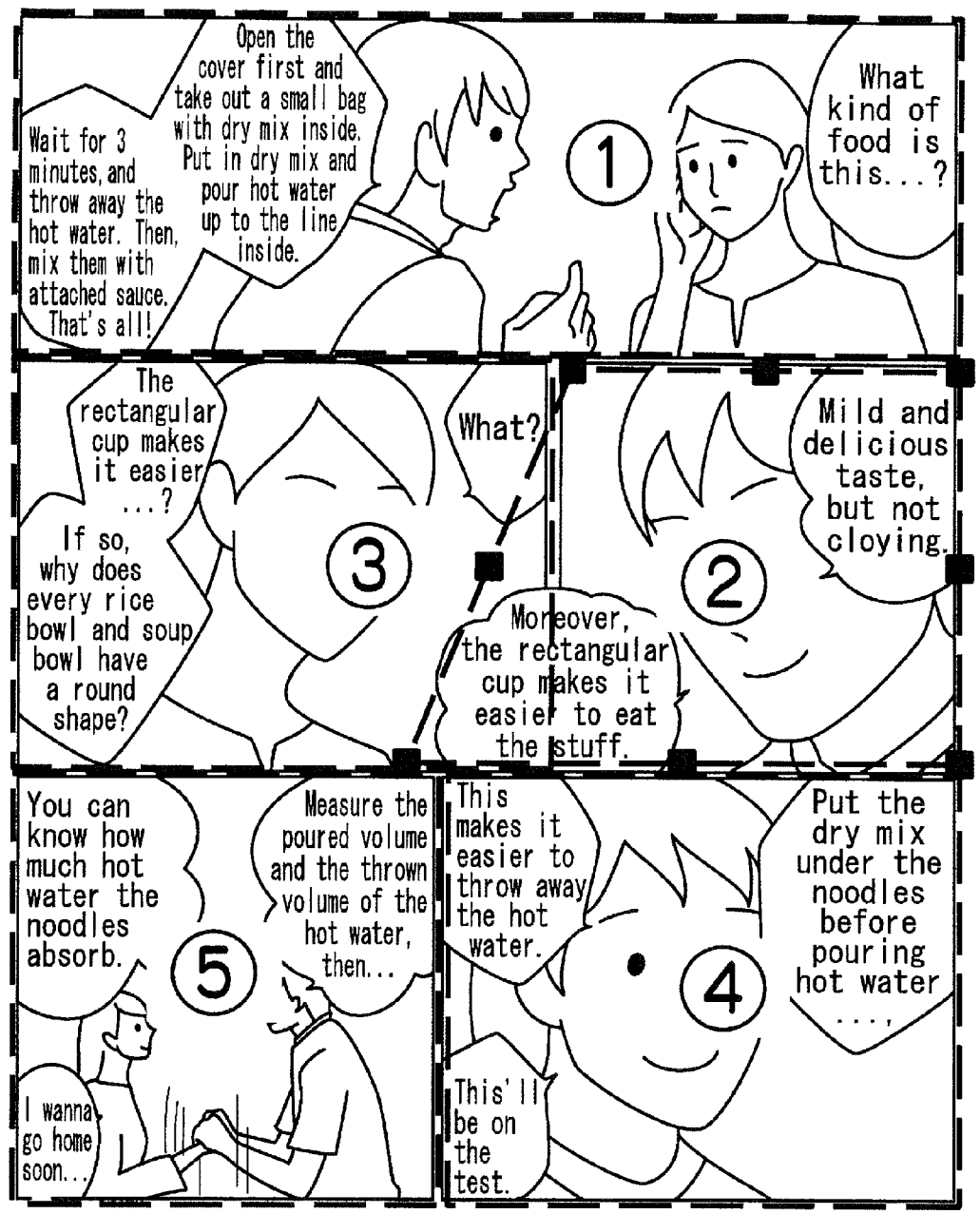
FIG. 9 illustrates a modification of a frame boundary line.

When the selected frame is double-clicked, a modification screen of the frame boundary line is displayed as shown in FIG. 9. A frame is represented with a polygonal shape having three or more vertexes, and a frame boundary line is represented with a line connecting three or more vertexes. In FIG. 9, since the frame has a square shape, total eight vertexes of the vertexes of the square shape and at rough center of the edges are displayed.

When the user inputs an instruction by double-clicking at a desired position on the frame boundary line through the operation section 12, a vertex is added to the position. Also, when the user inputs an instruction by double-clicking on a desired vertex through the operation section 12, the vertex is deleted.

When the user drags a desired vertex through the operation section 12, the vertex is shifted as shown in FIG. 9, the shape of the frame boundary line is modified. By repeating this operation, the shape and the size of the frame boundary line can be changed.

(4) Modification of Frame Order

When the user double-clicks on a number indicating the frame order through the operation section 12, the authoring section 10 receives the modification of the frame order, and modifies the frame order with the number input through the operation section 12. With this, when the automatically analyzed frame order is not correct, the frame order is modified.

When frame setting is made, the authoring section 10 modifies the frame information of the information file accordingly. When an instruction to display the registration screen is made after frame setting, the authoring section 10, displays the input number of the frame in a column of "koma" of the list L on the monitor 15. When the result shown in FIG. 6 is set, 5 is input in the "koma" with file ID of 1 as shown in FIG. 4.

When frame setting is made (in step S4), the authoring section 10 displays the original content image and the extraction result of the speech bubble of the content image which is automatically analyzed in step S3 on the monitor 15 next to each other, receives the correction input of the extraction result of the speech bubble through the operation section 12 and sets the speech bubble based on the result (step S5).

Figure 10:
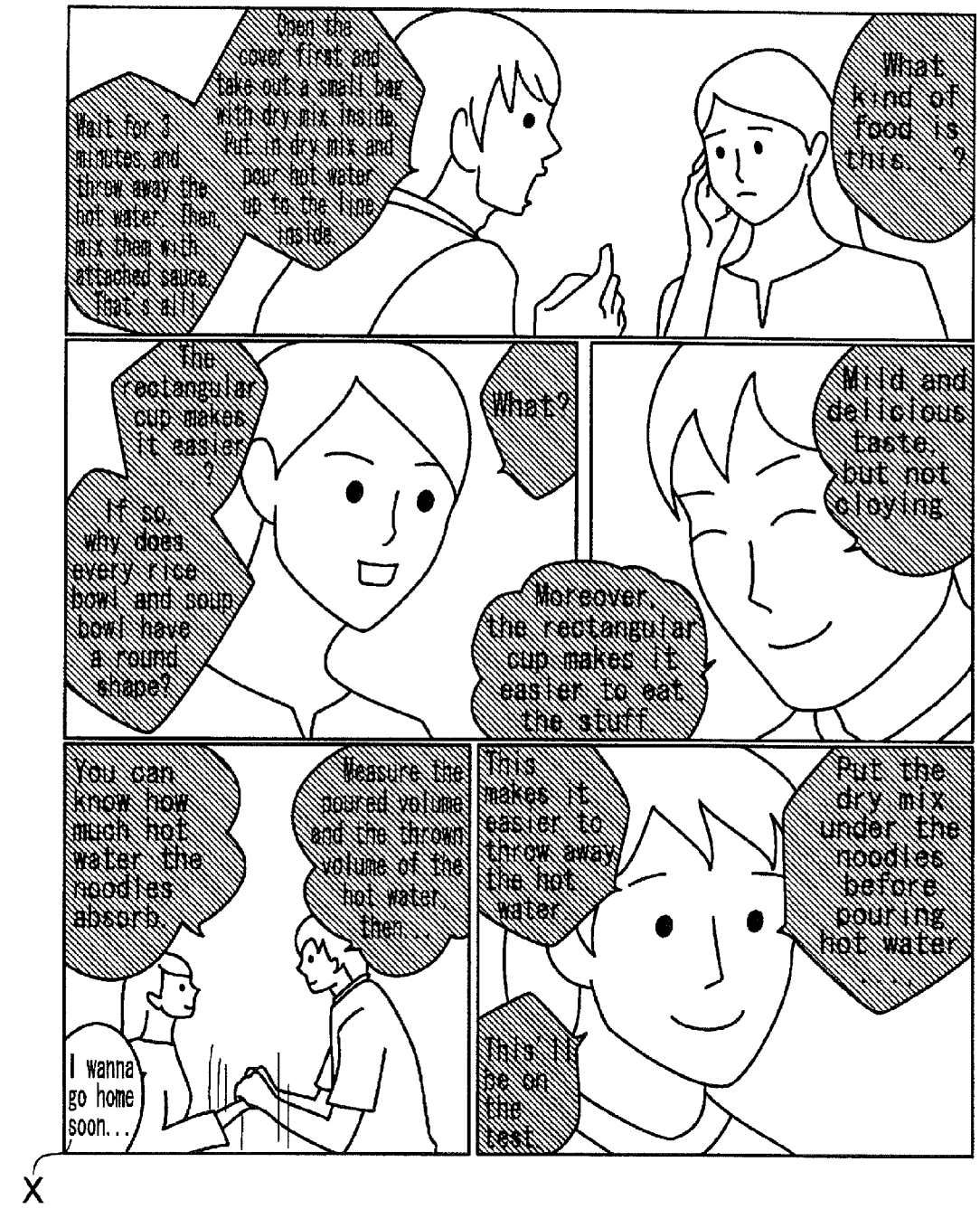
FIG. 10 illustrates a result of speech bubbles which are automatically extracted from the content image.

The processing in step S5 is described in detail. FIG. 10 is an extraction result of speech bubbles in the content image (file ID: 1, file name: yakisoba_003) shown in FIG. 3 obtained by automatic analysis. Actually, the content image shown in FIG. 3 and the speech bubble extraction result shown in FIG. 9 are displayed on the monitor 15 next to each other. However, only the speech bubble extraction result shown in FIG. 9 may be displayed. The authoring section 10 displays the speech bubble extraction result based on the information file. The authoring section 10 displays a covered over image of the extracted speech bubble on the monitor 15 so that the extracted speech bubble can be distinguished from other region. In FIG. 9, as the image indicating the speech bubble regions, an image in which the extracted speech bubbles are covered over by hatching is shown. An image in which the outer periphery edges of the speech bubbles are thickly drawn may be displayed as an image indicating the speech bubble regions.

(1) Addition of Speech Bubble

Figure 11:
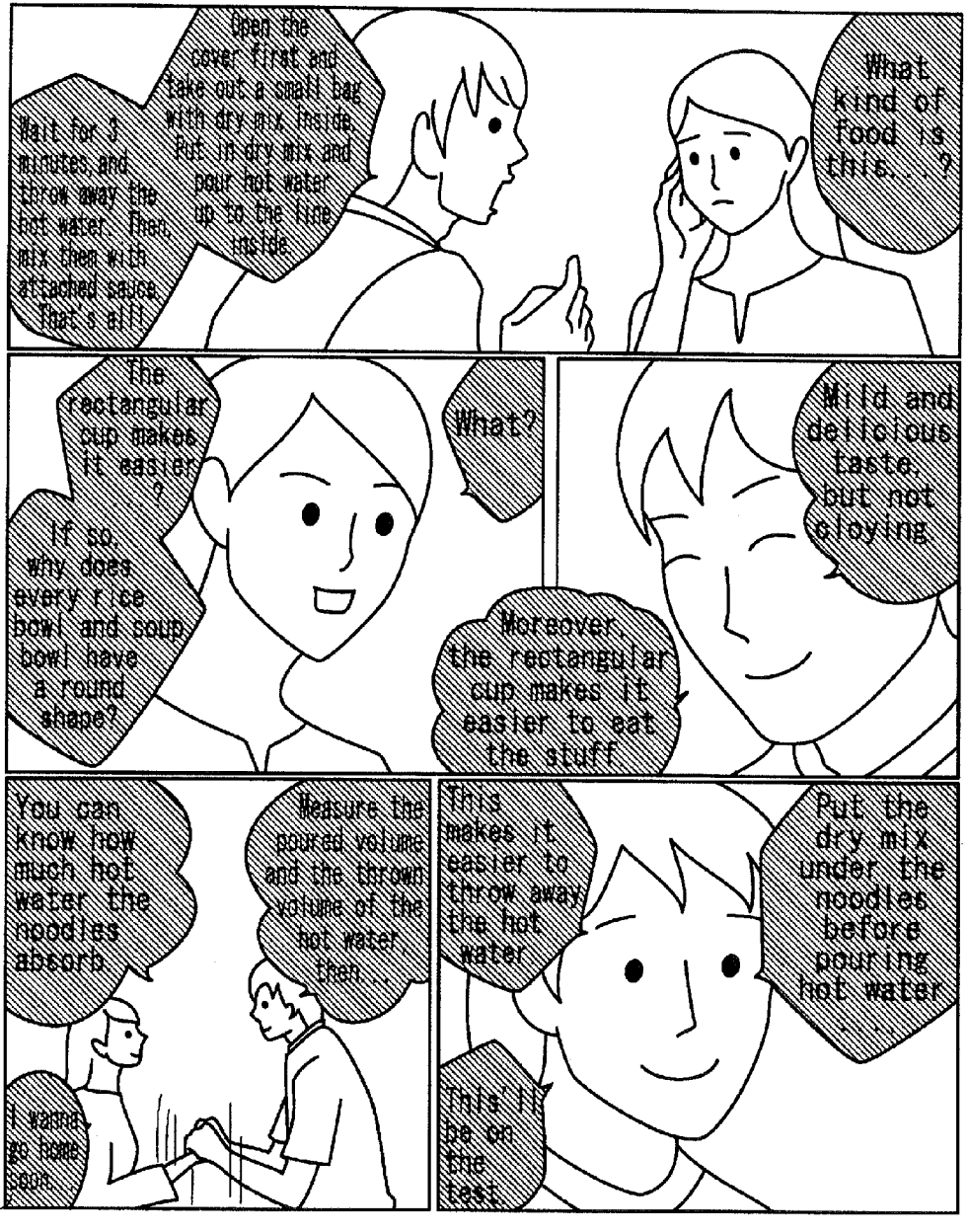
FIG. 11 illustrates a modification of the speech bubble extraction result shown in FIG. 10.

In the extraction result shown in FIG. 10, since a part of the boundary line of a speech bubble X at the bottom left is broken, it is not detected automatically. The user connects the portion where boundary line is broken through the operation section 12 to form a closed region. After that, when the user selects the closed region through the operation section 12 and indicates the recognition, the authoring section 10 automatically recognizes the selected closed region as a speech bubble. As a result, hatching is also displayed on the speech bubble X as shown in FIG. 11, and is set as a speech bubble same as the other speech bubbles.

(2) Deleting Speech Bubble

Figure 12:
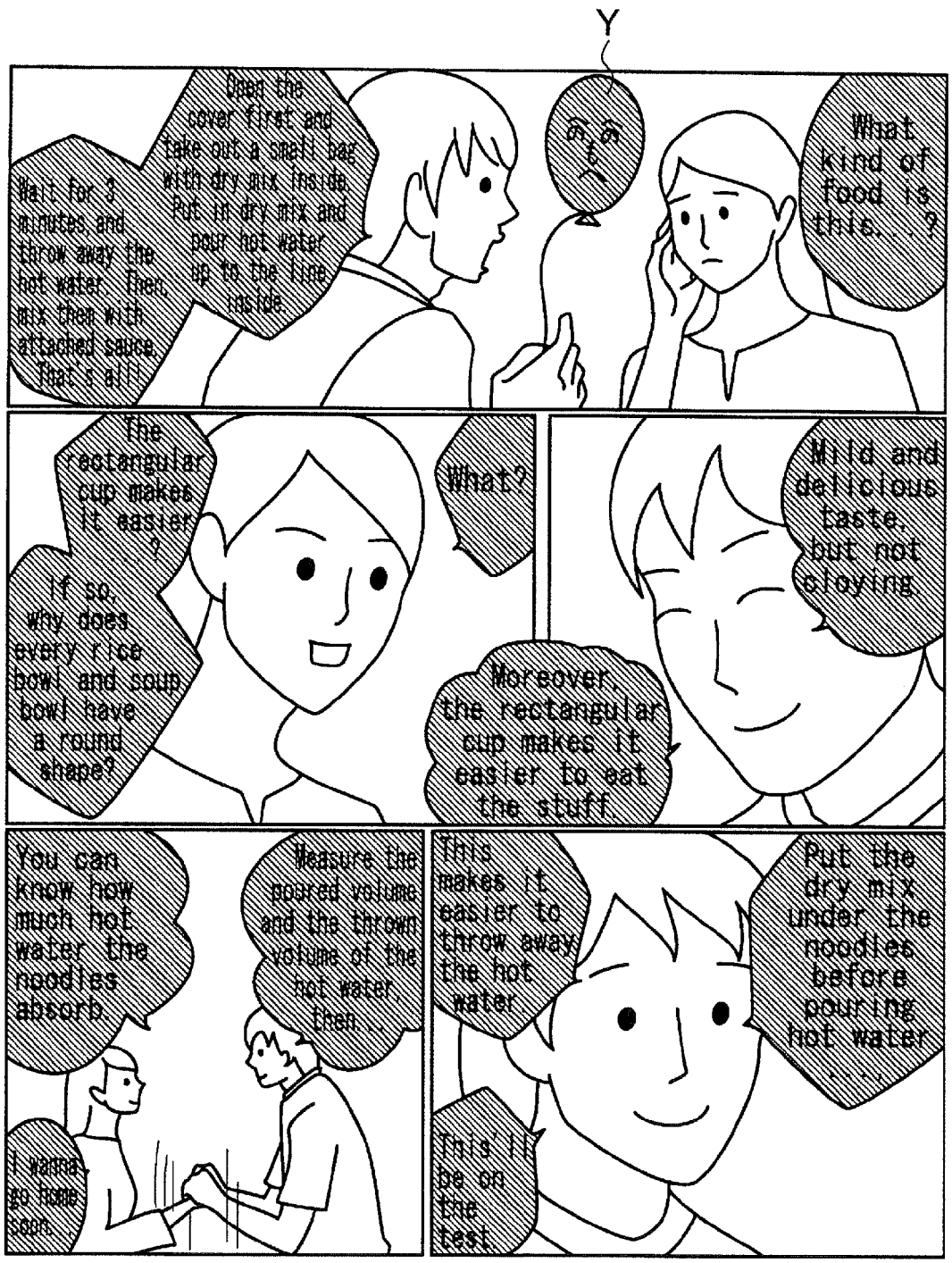
FIG. 12 illustrates a result of the speech bubbles which are automatically extracted from the content image.
Figure 13:
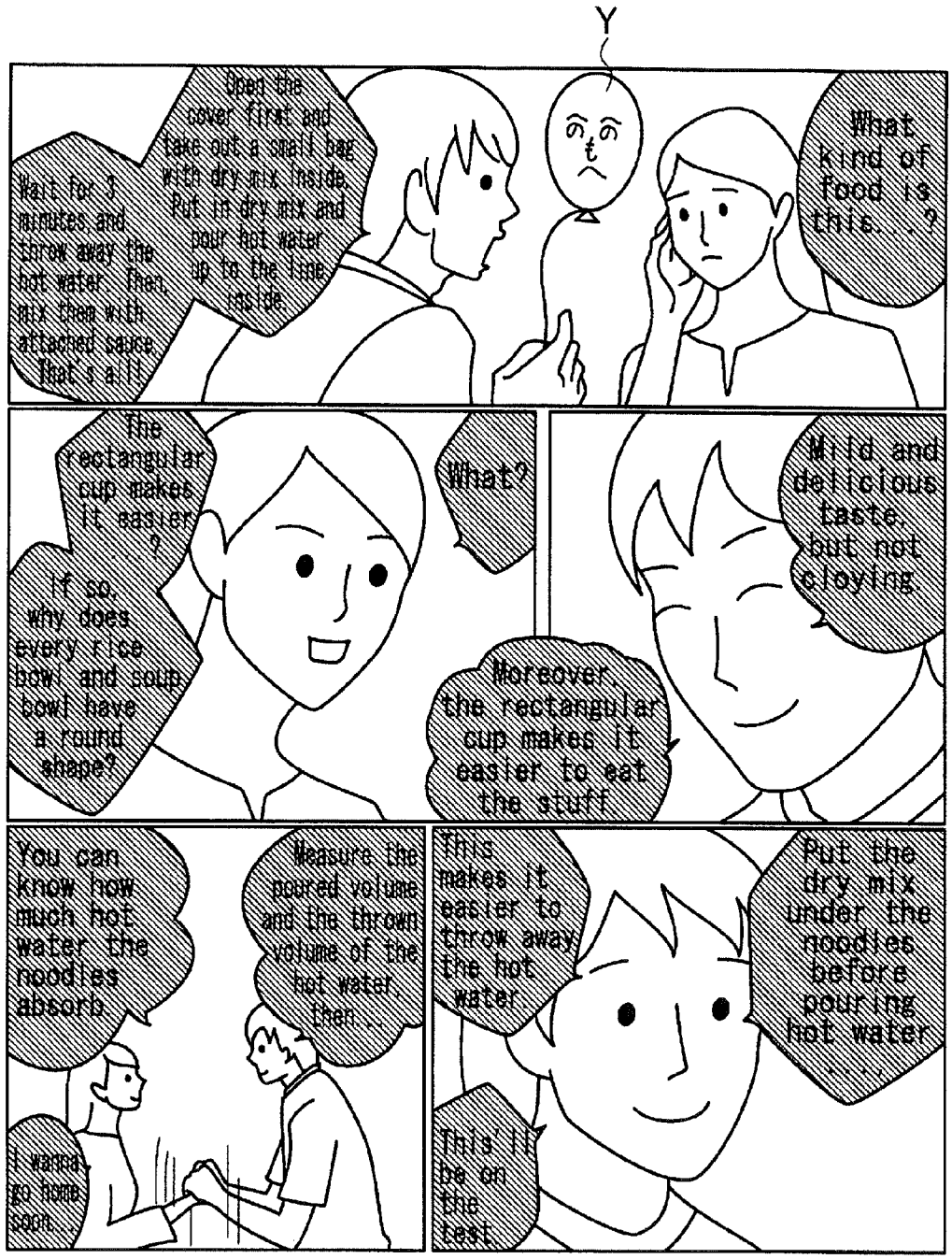
FIG. 13 illustrates a modification of the speech bubble extraction result shown in FIG. 12.

Since a balloon Y is a closed region, in the extraction result shown in FIG. 12, although the balloon Y is not a speech bubble, it is extracted as a speech bubble. This is caused from a false recognition of the characters in the balloon Y as a text. When the user selects the balloon Y through the operation section 12, the authoring section 10 deletes the automatically selected closed region (in this case, inside of the balloon Y) from the speech bubble. As a result, hatching is deleted from the balloon Y as shown in FIG. 13.

(3) Modifying Speech Bubble Region when Speech Bubble is not Detected Clearly

Figure 14:
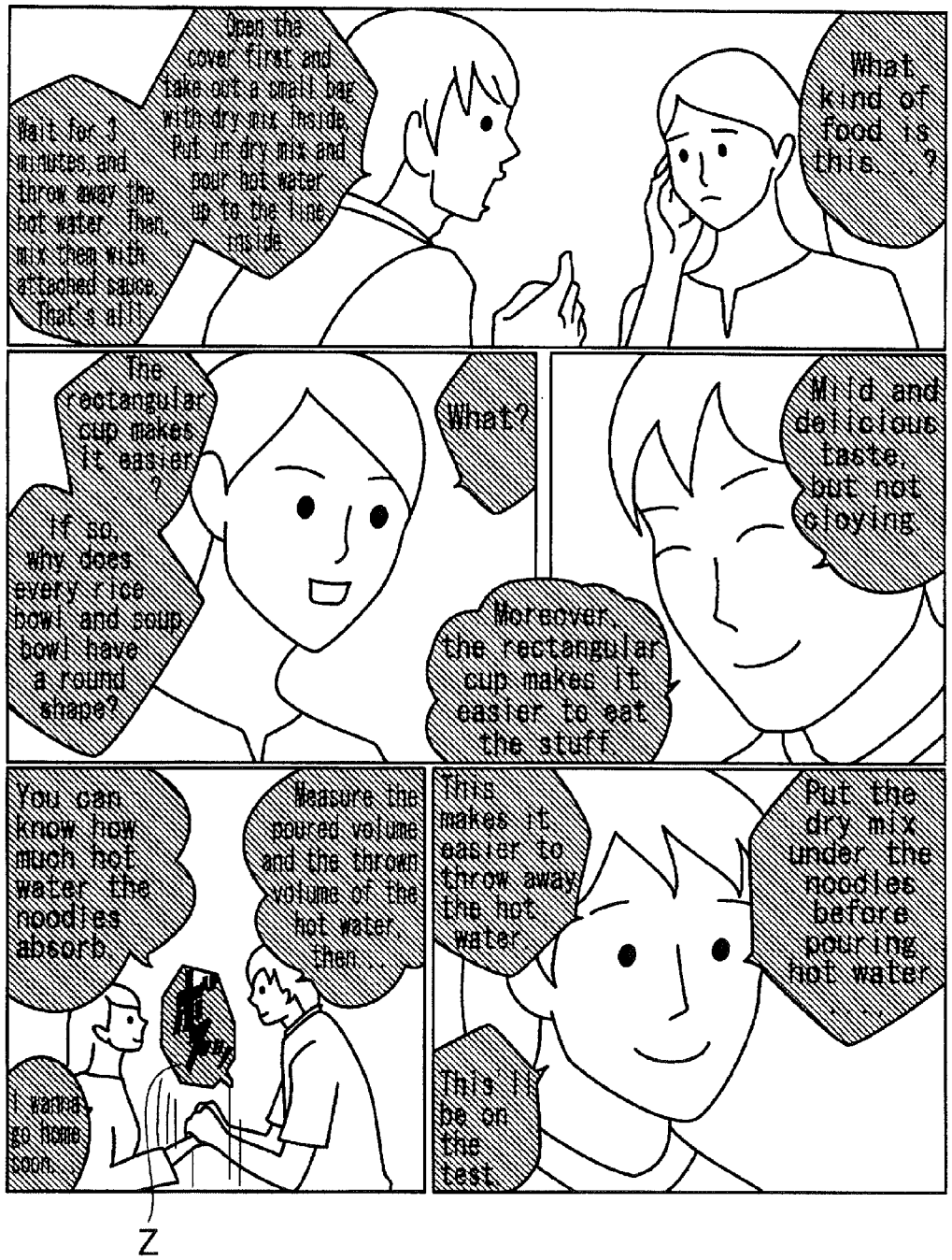
FIG. 14 illustrates a result of speech bubbles which are automatically extracted from the content image.
Figure 15:
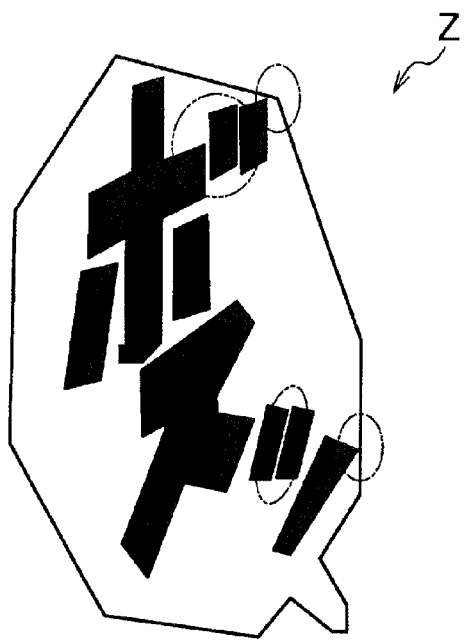
FIG. 15 illustrates an extraction of a speech bubble.

In an extraction result shown in FIG. 14, a part of a speech bubble Z at the top right is not extracted. This is caused when a character in the speech bubble is too close to the boundary line or in contact therewith as indicated with a chain line in FIG. 15; or when the characters in a speech bubble are too close to each other or in contact with each other as indicated with a two-dot chain line shown in FIG. 15.

Figure 16:
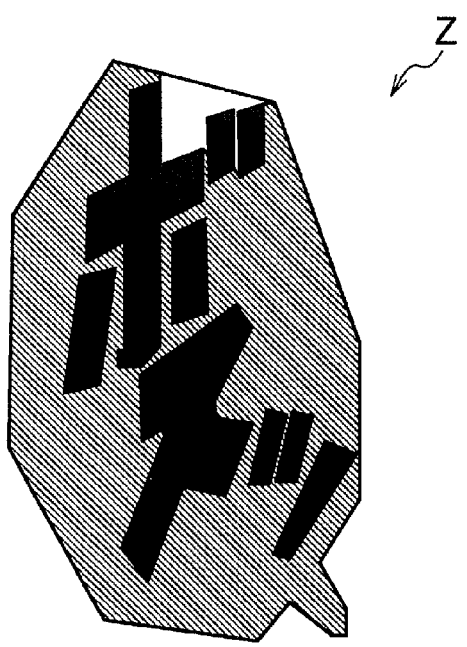
FIG. 16 illustrates an extraction of the speech bubble.
Figure 17:
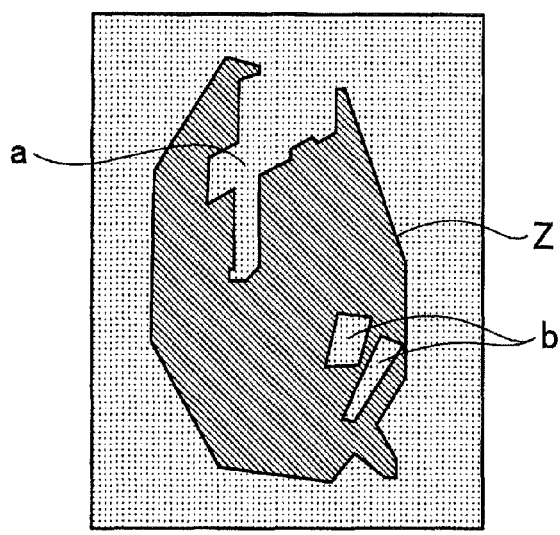
FIG. 17 illustrates an extraction of the speech bubble.
Figure 18:
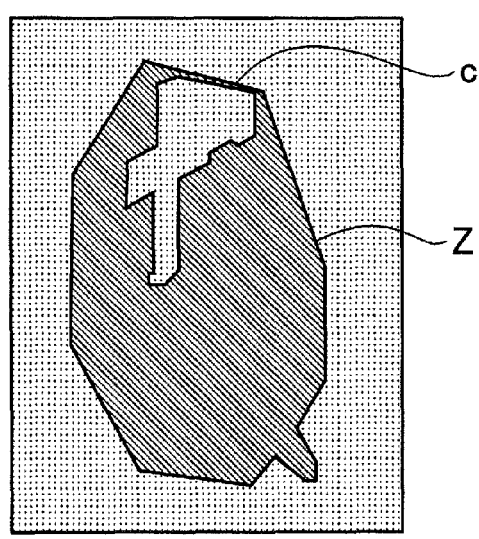
FIG. 18 illustrates an extraction of the speech bubble.
Figure 19:
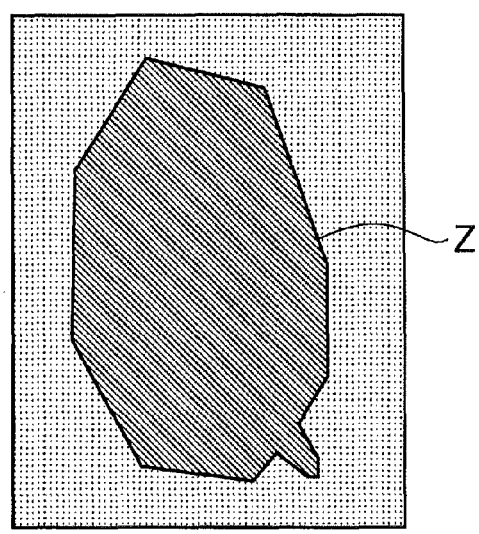
FIG. 19 illustrates an extraction of the speech bubble.

FIG. 16 is an enlarged view of the extraction result of the speech bubble Z shown in FIG. 14; FIG. 17 illustrates the extraction result shown in FIG. 16 from which characters are deleted. As shown in FIG. 17, in the speech bubble Z, a part of the boundary line is in contact with the character (FIG. 17-a); a part of the characters runs off the speech bubble (FIG. 17-b). Therefore, when the user selects closed region b in the speech bubble through the operation section 12, the authoring section 10 automatically determines the closed region b as a speech bubble (refer to FIG. 17) as shown in FIG. 18. Also, when the user adds a boundary line c of the speech bubble through the operation section 12 as shown in FIG. 18, the authoring section 10 automatically determines the closed region generated by the boundary line c (refer to FIG. 18) as a speech bubble as shown in FIG. 19. As a result, the speech bubble, which was not detected clearly, is extracted correctly as shown in FIG. 19.

When correction input of the extraction result of the speech bubble is made as described above, the authoring section 10 modifies the speech bubble information in the information file accordingly.

After completing the speech bubble setting (step S5), the authoring section 10 displays the original content image and the text recognition result of the content image which is automatically analyzed in step S3 on the monitor 15 next to each other, and receives correction input of the recognition result of the text made through the operation section 12 and performs the text setting based on the result (step S6).

Figure 20:
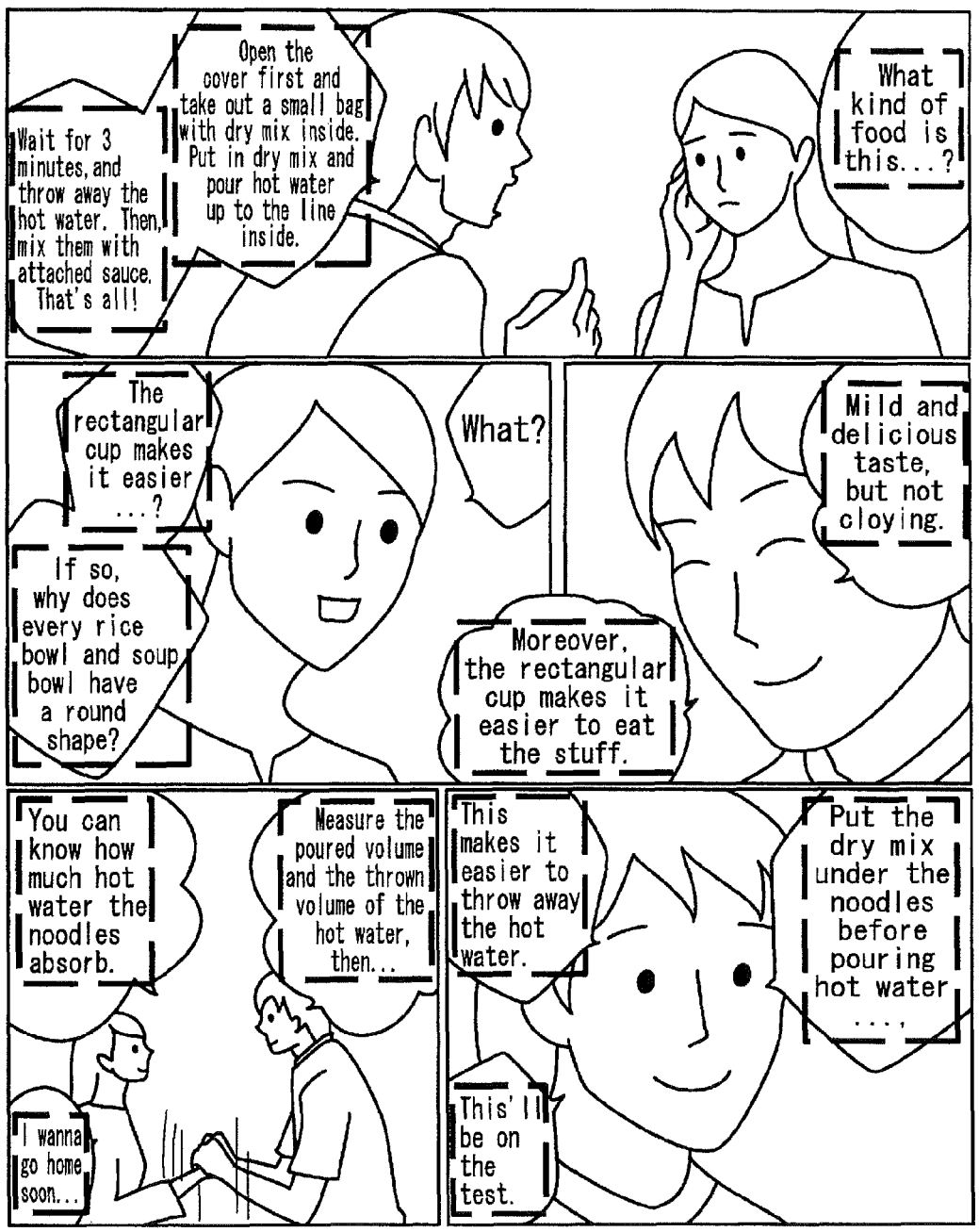
FIG. 20 illustrates a result of texts which are automatically extracted from the content image.

The processing in step S6 is described in detail. FIG. 20 illustrates a text recognition result obtained by automatic analysis of a content image (file ID: 1, file name: yakisoba_003) shown in FIG. 3. Actually, the content image shown in FIG. 3 and the recognition result shown in FIG. 20 are displayed on the monitor 15 next to each other. However, only the text recognition result shown in FIG. 20 may be displayed. The authoring section 10 displays the extraction result of the text based on the information file. The authoring section 10 displays an image in which the outer periphery edge of the text region in a thick line on the monitor 15 thereby the text region and other regions can be recognized. In FIG. 20, an image in which the outer periphery edge of the text region is drawn with a thick line is shown as the image indicating the text region. However, an image indicating text region, in which the text region is translucently covered over may be displayed. By covering over translucently, the user can recognize the text.

(1) Adding Text

Figure 21:
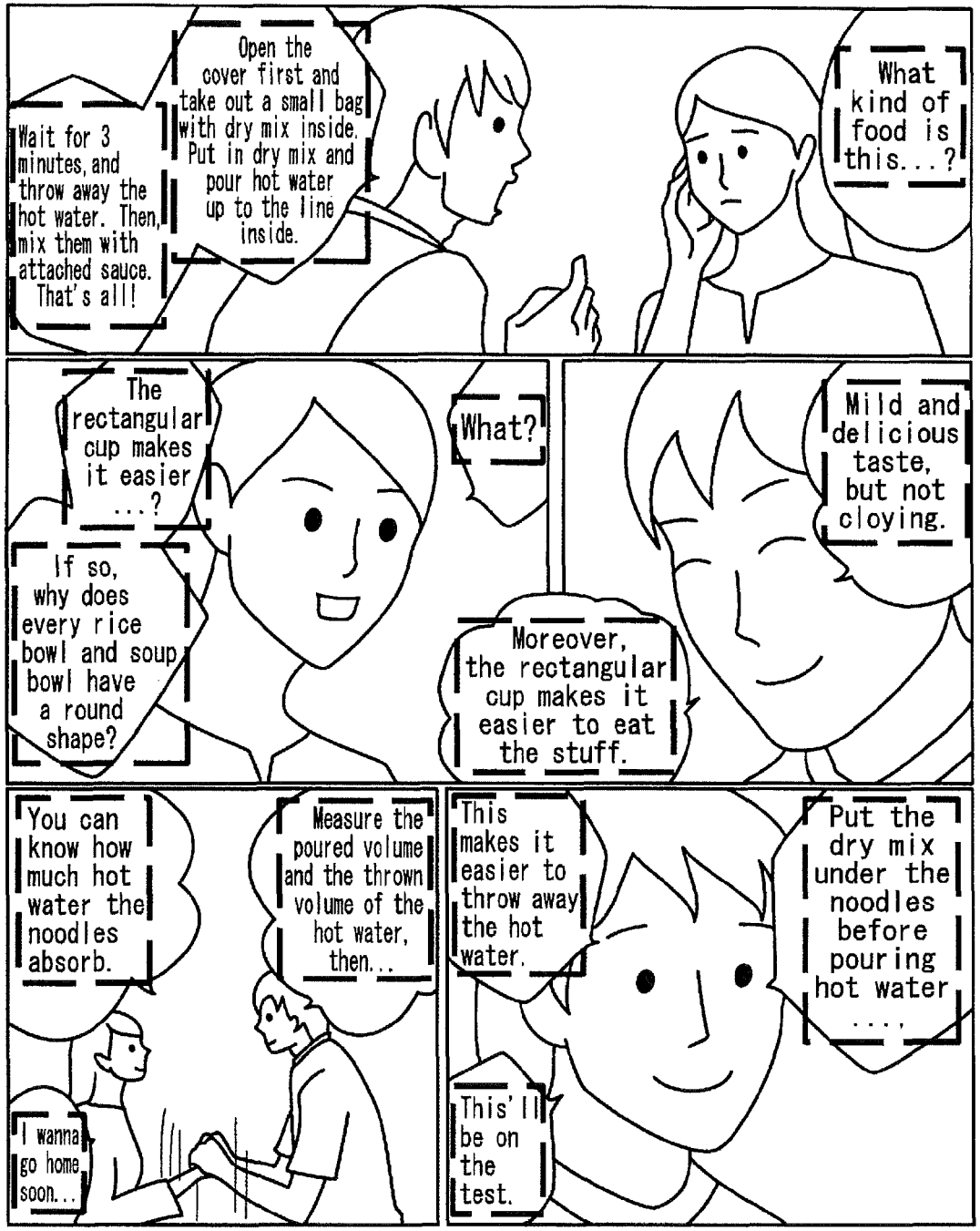
FIG. 21 illustrates a modification of the text extraction result shown in FIG. 20.

In FIG. 20, a text "What?" of hand written characters is not recognized. When the user encloses "What?" through the operation section 12 to instruct to recognize the same, the authoring section 10 recognizes the closed region enclosing "What?" as a text region. As a result, "What?" is also set as a text region as shown in FIG. 21, and thus, the text region information is acquired.

After the text region is set, the character data is specified by the optical character reader of the authoring section 10. When the character data is not specified, the authoring section 10 prompts the user to input, and the user inputs the characters through the operation section 12. With this, the information on the content of the text is acquired.

When correction input of the text extraction result has been made as described above, the authoring section 10 modifies the text information in the information file.

(2) Deleting Text

When a text region is erroneously recognized, the user selects a desired position on the erroneous text region through the operation section 12 and gives an instruction to perform recognition. Then, the authoring section 10 automatically deletes the text region selected from the information file. The authoring section 10 also deletes a piece of information on the text content of the deleted text region from the information file.

When the text setting (step S6) is completed, the authoring section 10 automatically extracts a region of interest (hereinafter, referred to as ROI) from the original content image (step S7). ROI means an item to be always displayed on the digital book viewer 2, which is a face (or a region equivalent to face) of a character in the original comic of the content image. The character includes not only a person but also an animal, a non-living material such as a telephone, a PC, electronic equipment and a robot.

The authoring section 10 includes a known image analysis technology, for example, a face detection device which automatically detects a face of a character by using a face detection technique, and the face detection device detects the face of the character from the content image. The authoring section 10 sets a polygonal shape region enclosing the detected face as a region of interest. The position, size, type of content elements such as animal, building, vehicle and other objects may be automatically detected based on the feature amount of information on the images by using known image analysis technology.

The authoring section 10 stores a piece of region of interest information which is a piece of information on the region of interest (ROI) in the information file. The region of interest information may be a piece of vector data representing coordinates of each vertex of the ROI, a shape of the ROI or an outer periphery edge of the ROI. The region of interest information further includes a piece of information on the characters included in the ROI (for example, automatically given character ID). Also, the region of interest information may include priority order, important degree to display, ID information (name etc) of the character, character's attributes (sex, age etc) and the like.

When the automatic extraction (step S7) of the ROI has completed, the authoring section 10 receives correction input of the ROI extraction result and performs ROI setting based on the result (step S8).

Figure 22:
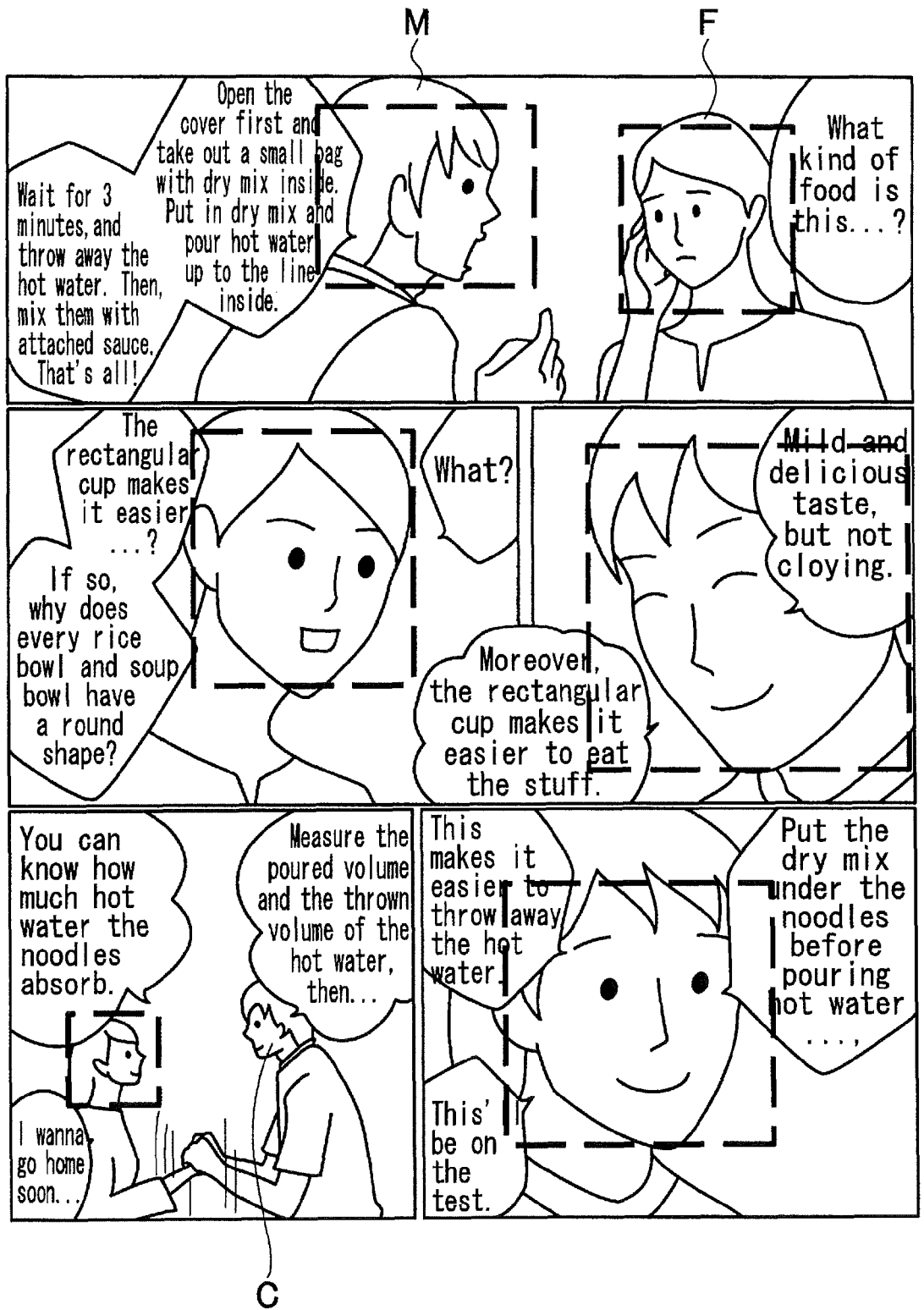
FIG. 22 illustrates a result of regions of interest which are automatically extracted from the content image.

The processing in step S8 is described in detail. FIG. 22 shows a ROI extraction result made through automatic analysis of the content image shown in FIG. 3 (file ID: 1, file name: yakisoba_003). Actually, the content image shown in FIG. 3 and the recognition result shown in FIG. 22 are displayed next to each other on the monitor 15. However, only the ROI extraction result shown in FIG. 22 may be displayed. The authoring section 10 displays the ROI extraction result based on the information file. The authoring section 10 displays the image with the outer periphery edge of the ROI thickly drawn on the monitor 15, to facilitate recognition of the ROI and other regions. In FIG. 22, the image in which the outer periphery edge of the ROI is thickly drawn is shown as an image representing the ROI. The translucently covered over ROI may be displayed as the image representing the ROI region. By translucently covering over, the user can recognize the characters.

(1) Adding ROI

Figure 23:
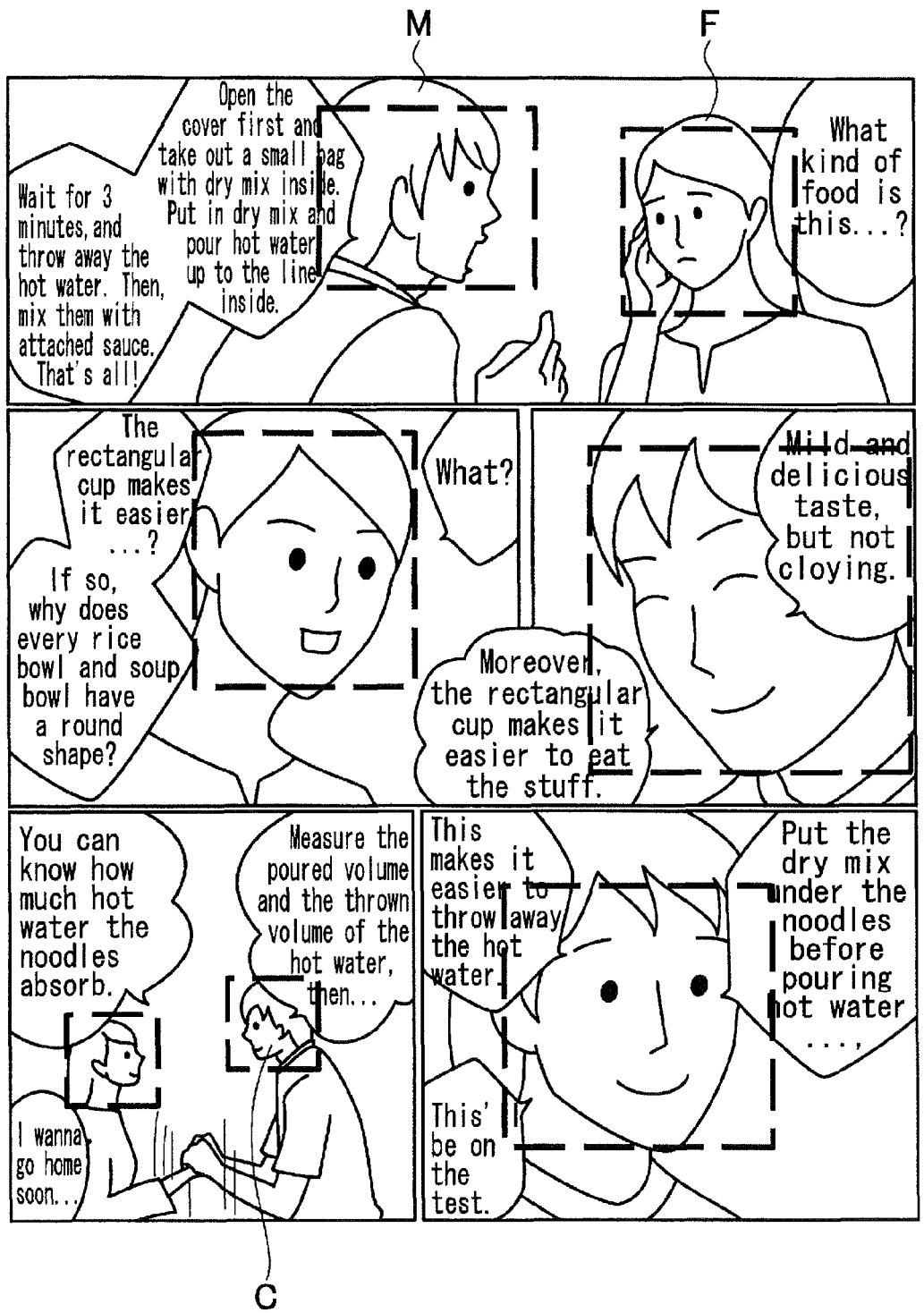
FIG. 23 illustrates a modification of the region of an interest extraction result shown in FIG. 20.

In FIG. 22, the characters include a man M and a woman F, a face C facing leftward of man M turning his head to a side is not recognized. When the user selects a desired position on the face C facing leftward of the man M turning his head to a side through the operation section 12 and gives an instruction to perform recognition, the authoring section 10 recognizes a closed region including the indicated position as the ROI. Also, the authoring section 10 modifies the region of interest information in the information file accordingly. As a result, an image representing the ROI is displayed on the face C facing leftward of the man M as shown in FIG. 23.

(2) Deleting ROI

When the ROI is erroneously extracted, the user selects a desired point on an incorrect ROI through the operation section 12 and gives an instruction to recognize. The authoring section 10 automatically deletes the region of interest information selected from the information file. With this, the image representing erroneous ROI is deleted from the monitor 15.

When the ROI setting (step S8) is completed, the authoring section 10 performs pairing to make a connection between the ROIs and the speech bubbles (step S9). The pairing makes a connection between a dialog in a speech bubble (speech bubble and text) and its generation source (ROI).

Figure 24:
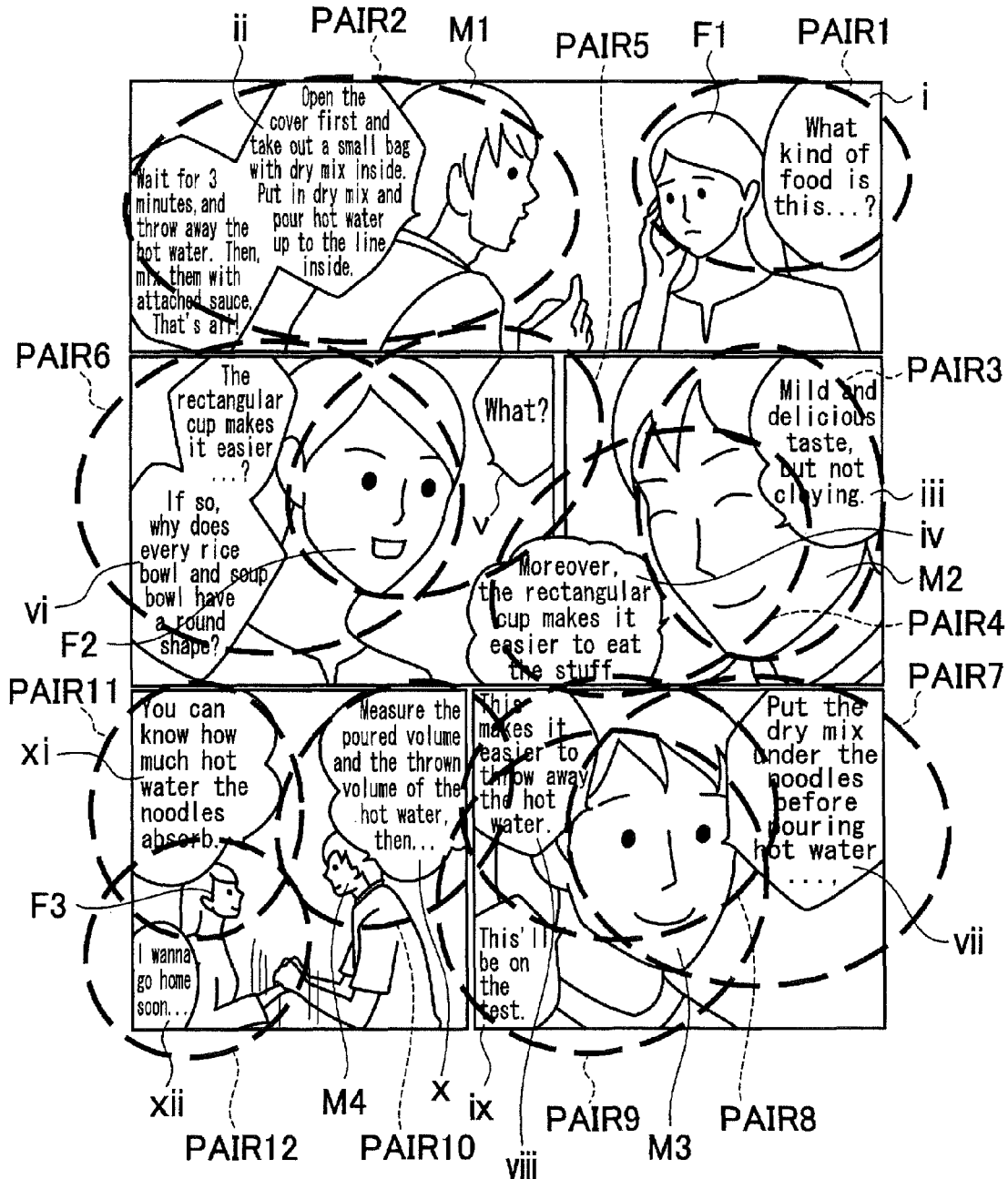
FIG. 24 illustrates pairing of the speech bubbles and the regions of interest.

FIG. 24 illustrates a result that speech bubbles, texts and ROIs are set in steps S5-S7. In FIG. 24, speech bubbles i-xii are included as the speech bubble; a woman F (F1-F3) and a man M (M1-M4) are included as the ROI. Although the woman F1-F3 is all the identical person (woman F), the expression of woman F1-F3 is employed for the sake of description. Likewise, although the man M1-M4 is all the identical person (man M), the expression of man M1-M4 is employed for the sake of description.

A method to perform the pairing manually is described. The authoring section 10 displays a content image on the monitor 15 based on the information file in a state the speech bubbles and ROIs, which are set in steps S5 and S7, are selectable. When the user selects a predetermined speech bubble and an ROI one each through the operation section 12, the authoring section 10 recognizes the speech bubble and the ROI and sets the same as a pair. The speech bubble i is a speech of the woman F1. Therefore, when the speech bubble i and the woman F1 are selected through the operation section 12, the authoring section 10 automatically recognizes the speech bubble i and the woman F1 as a pair and sets the speech bubble i and the woman F1 as a pair 1. Likewise, when the speech bubble ii and the man M1 are selected through the operation section 12, the authoring section 10 automatically recognizes the speech bubble ii and the man M1 as a pair and sets the speech bubble ii and the man M1 as pair 2. After completing the pairing on every speech bubble, the authoring section 10 stores the pairing result in the information file.

Next, a description is made on the method that the authoring section 10 automatically performs the pairing first, and subsequently modification is made manually. The authoring section 10 automatically performs pairing on ROI and speech bubble neighboring each other based on the information file. In the case shown in FIG. 24, the speech bubble i and the woman F1 are set as pair 1; the speech bubble ii and the man M1 are set as pair 2; the speech bubble iii and the man M3 are set as pair 3; the speech bubble iv and the man M2 are set as pair 4; the speech bubble v and the woman F2 are set as pair 5; the speech bubble vi and the woman F2 are set as pair 6; the speech bubble vii and the man M3 are set as pair 7; the speech bubble viii and the man M3 are set as pair 8; the speech bubble ix and the man M3 are set as pair 9; the speech bubble x and the man M4 are set as pair 10; the speech bubble xi and the woman F3 are set as pair 11; and the speech bubble xii and the woman F3 are set as pair 12.

The authoring section 10 stores the pairing result in the information file, and displays the content image on the monitor 15 in a state in which the pairing result is recognizable based on the information file. For example, an image in which a pair is enclosed by a dotted line is displayed being superimposed on a content image.

When the user selects an image in which a predetermined pair is enclosed with a dotted line through the operation section 12, the authoring section 10 receives the modification of the pair. In the example shown in FIG. 24, the speech bubble xi should not be paired with the woman F3 but with the man M 4. Therefore, the pair 11 should be modified. When the user double-clicks the pair 11 through the operation section 12, the pair 11 gets ready to be edited. When the speech bubble xi and the man M 4 are selected, the authoring section 10 reset the speech bubble xi and the man M 4 as the pair 11, and modifies the information file.

Figure 25:
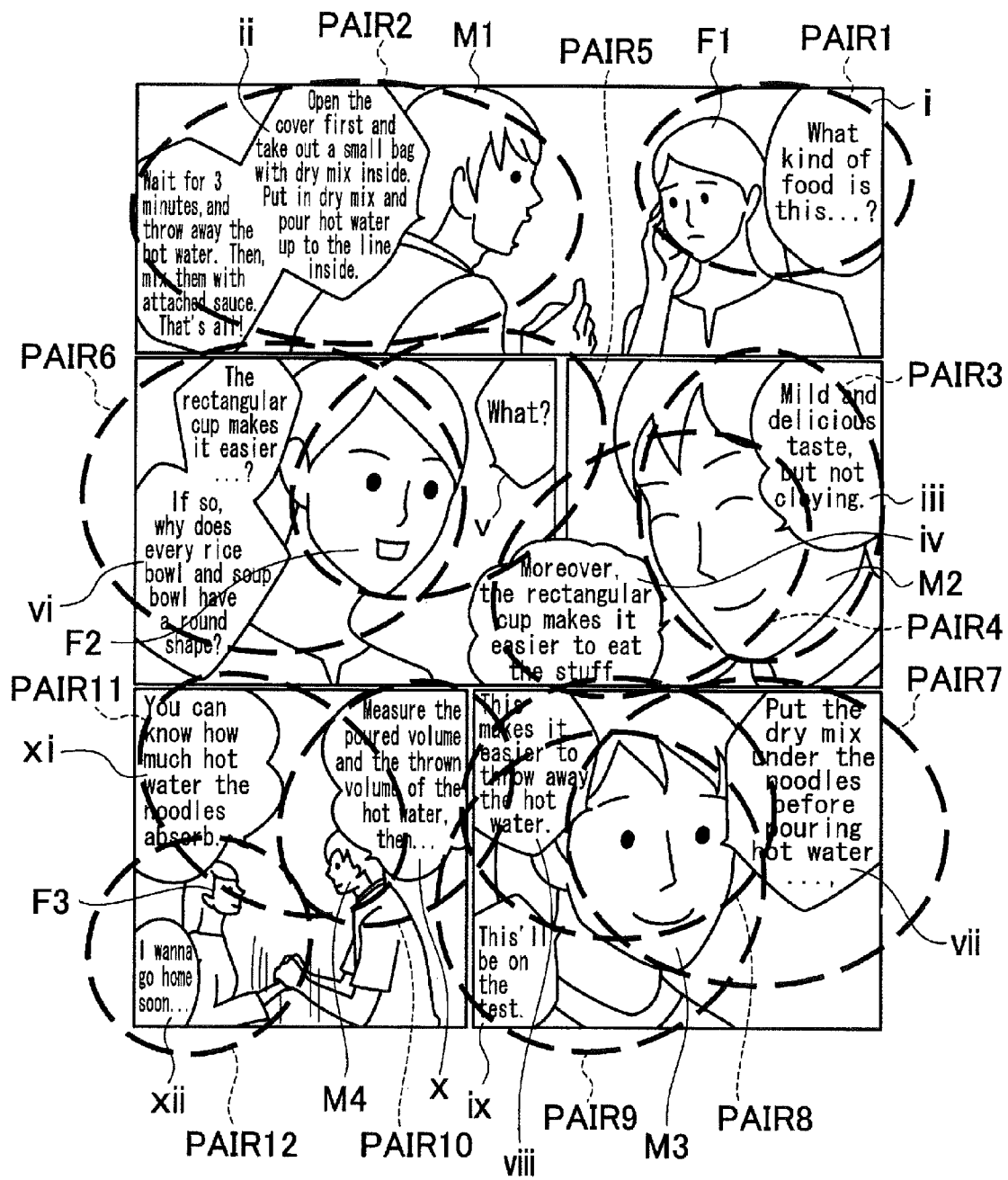
FIG. 25 illustrates pairing of the speech bubbles and the regions of interest.

The authoring section 10 displays the content image in a state the pairing result is recognizable on the monitor 15 based on the modified information file. As a result, the modification result of the pair 11 can be checked on the monitor 15 as shown in FIG. 25.

The pairing may be allotted with a number. The authoring section 10 may allot numbers from the pairing of the speech bubble located at the top right, or may allot numbers based on the input through the operation section 12. The numbers may represent the display order of the speech bubble.

Finally, the authoring section 10 stores a master data including the information file updated in steps S4-S9 and the content image in the DB 11 (step S10).

Figure 26:
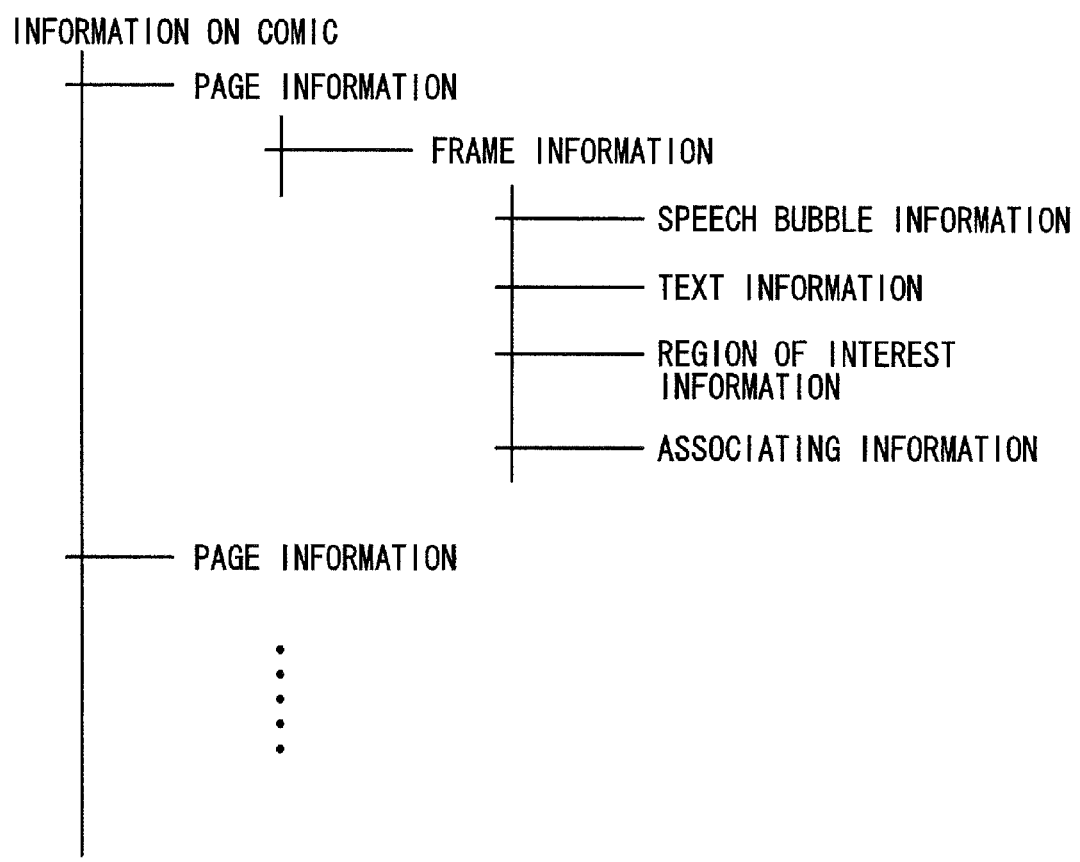
FIG. 26 is a frame format of a structure of an information file.

FIG. 26 illustrates a structure of the master data. In this embodiment, since each comic has an information file, the information file includes plural pieces of page information. The respective pages have a piece of page information; a piece of frame information is made connected with the page information; and the speech bubble information (text information) and the region of interest information are made connected with the frame information. The information file may be created not for each comic but for each page.

By creating the master data, it is made possible to edit the content in accordance with the digital book viewer, automatic translation of the text, translation editing and sharing and display processing appropriate for digital book viewer, and delivery of the digital book is facilitated.

In this embodiment, the authoring section 10 acquires a content image and creates a master data which stores the frame information, the speech bubble information, the text information and the like. However, the authoring section 10 may acquire a master data (equivalent to the master data created in step S2 shown in FIG. 2) which has an information file storing various kinds of information, and then perform the processing in steps S3-S10 and may store a final master data in the DB. Also, the authoring section 10 may acquire a master data (equivalent to the master data created in step S3 shown in FIG. 2) which has an information file in which frames, speech bubbles and texts are automatically extracted, and the frame information, the speech bubble information and the text information are stored, and may store a final master data in the DB after performing the processing in steps S4-S10.

(B) Master Data Edition Processing

Figure 27:
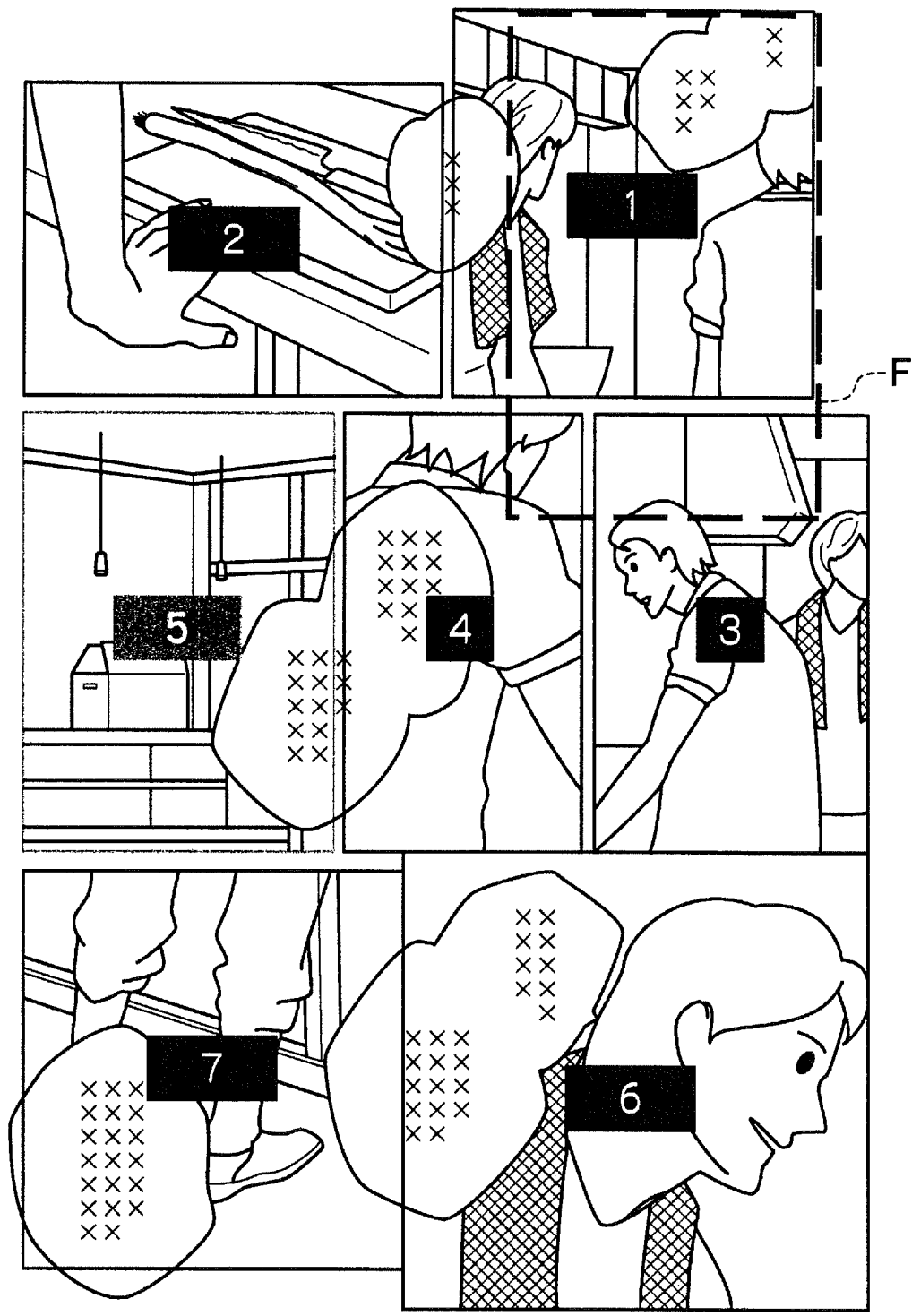
FIG. 27 is an example of a monitor screen when editing master data.

FIG. 27 illustrates a display screen for performing editing for a digital book viewer. The authoring section 10 displays a content image on the monitor 15. The authoring section 10 displays the frame boundary line of each frame with a thick line based on the information file. Roughly in the center of each frame, a frame order representing reading order of the frame is displayed. The display of the frame order is not limited to the above, but the frame order may be displayed at a corner of the frame.

The authoring section 10 acquires a screen size of the digital book viewer 2 from the DB 11 or the like, and displays a border F representing the screen size of the digital book viewer 2 superimposing the same on the content image based on the information on the screen size of the digital book viewer 2 and the information of the information file. When the user input an instruction to shift the border F vertically/horizontally through the operation section 12, the authoring section 10 shifts the border F vertically/horizontally responding to the instruction from the operation section 12.

The authoring section 10 determines the minimum display times; that is, scroll times necessary for displaying entire of the frame based on the information on the screen size of the digital book viewer 2 and the information of the information file and displays the information (marker) superimposing the same on the content image. In this embodiment, since the marker is displayed roughly in the center of each frame, in the FIG. 27, the frame order is displayed being superimposed on the marker.

In FIG. 27, scroll times are represented with a rectangular marker. When the scroll time is once, in FIG. 27, the frame order is displayed with a marker of square shape of a in each edge length like frames 3 and 4. When the scroll times are two or more, a rectangular marker of a of integer times in an edge length is displayed. When the scroll in a vertical direction is n times; and the scroll in the horizontal direction is m times, a rectangular marker of naxma in vertical and horizontal length is displayed. In frames with frame order 1, 2, 6 and 7 in FIG. 27, since horizontal scroll is two times and vertical scroll is once, a rectangular marker of 2a in horizontal direction and a in vertical direction is displayed. By displaying the marker as described above, the times and direction of the scroll can be easily understood at a glance of the marker without interposing the border F on each frame.

Figure 28:
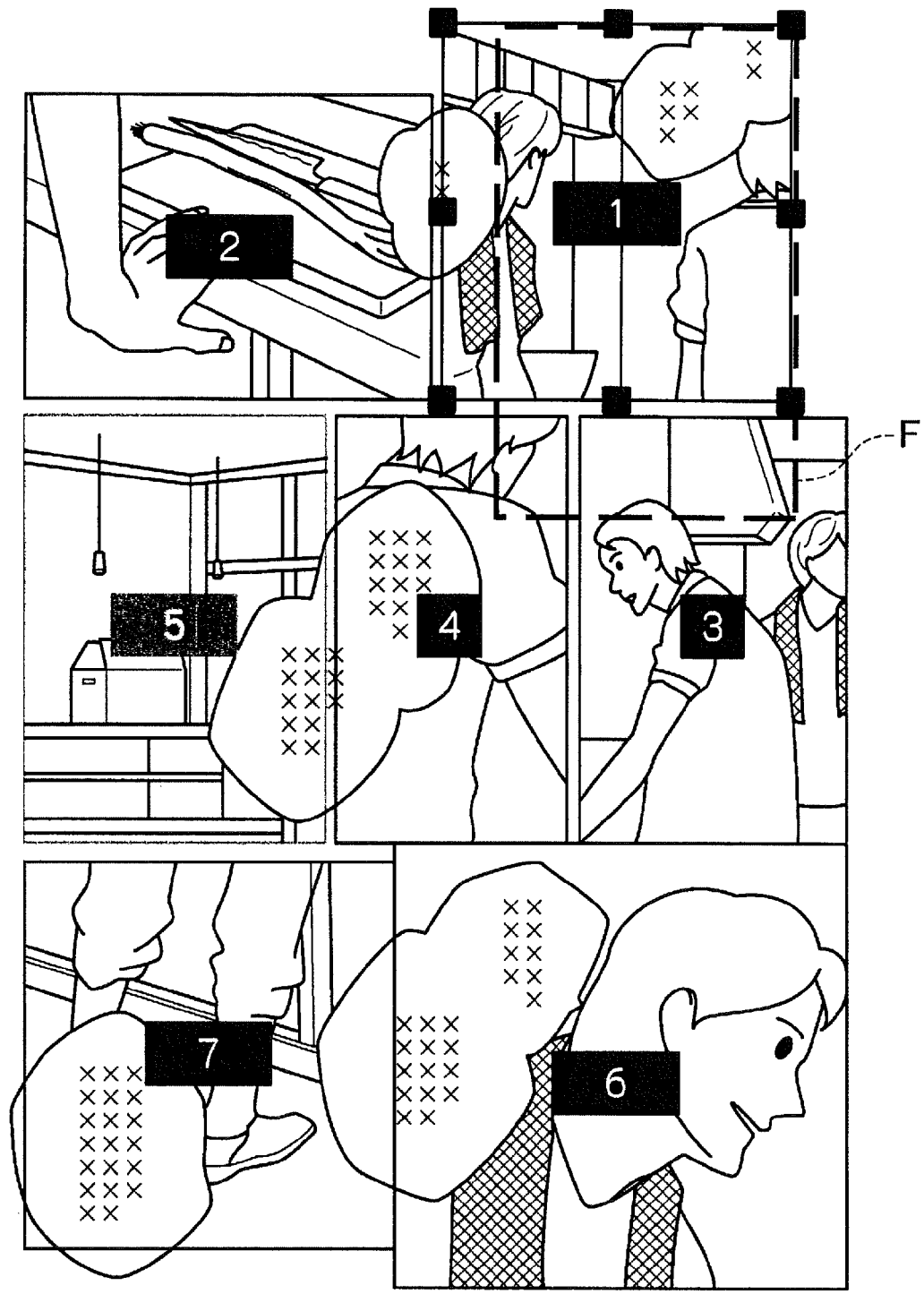
FIG. 28 is an example of the monitor screen when editing master data.

The user shifts the frame boundary line as described above while monitoring the image displayed on the monitor 15. When the user makes double click or the like on the frame boundary line through the operation section 12, the authoring section 10 displays vertexes on the frame boundary line as shown in FIG. 28 to allow editing on the frame boundary line. When the user drags a desired vertex through the operation section 12 same as step S4 (FIG. 9), the vertex is shifted and the shape of the frame boundary line is modified. By repeating this operation, shape (for example, change from a pentagon to a rectangle) and size of the frame boundary line can be changed. Also, a vertex may be added or deleted. Since the operation to add or delete a vertex is the same as step S4, the description thereof is omitted here.

When the size of a frame is slightly larger than the screen size of the digital book viewer 2, the authoring section 10 displays a frame boundary line of a frame slightly larger than the screen size of the digital book viewer 2 with a color different from that of the other frame boundary lines based on the information on the screen size of the digital book viewer 2 and the information of the information file. The case when the vertical and horizontal sizes of the frame is slightly larger than the screen size of the digital book viewer 2 is conceivable that, for example, assuming about 10% of the screen size of the digital book viewer 2 as the threshold value, a case where the length of a edge of the frame is larger by about 10% than the screen size of the digital book viewer 2. In FIG. 27, the frame boundary line of the frame with frame order 5 is indicated with a color different from that of other frame boundary lines.

Figure 29:
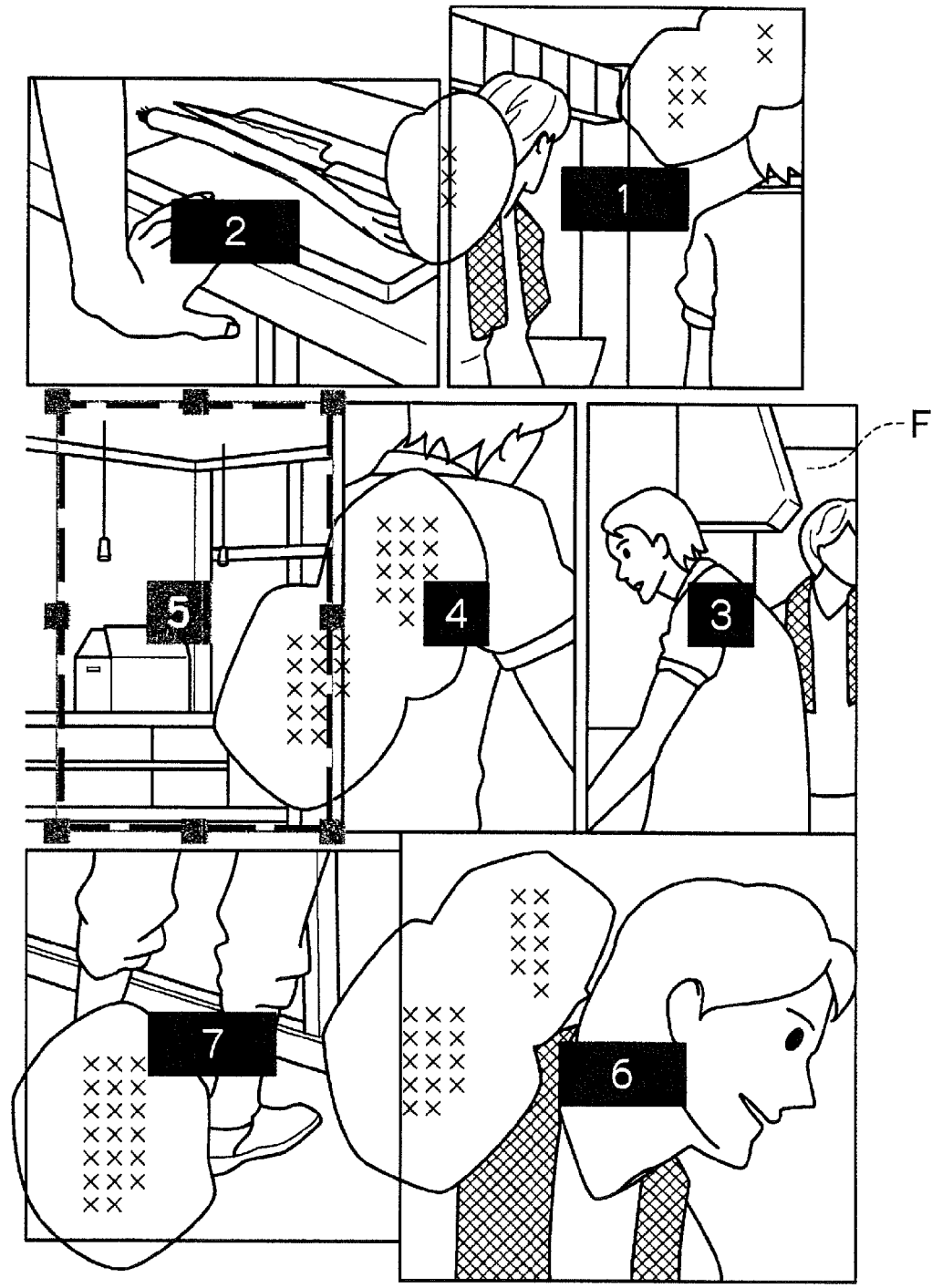
FIG. 29 is an example of the monitor screen when editing master data.

In the frame slightly larger than the screen size of the digital book viewer 2, the scroll time can be reduced to once and the visibility can be increased by arranging a portion with little importance within the frame to be invisible as if the same is not included in the frame. As shown in FIG. 29, the position and shape of the frame boundary line of the frame with frame order 5 which is slightly larger than the border F are changed so that the scroll time becomes once. In FIG. 29, the frame with frame order 5 is arranged to be smaller so that a left end part is excluded from the frame resulting in scroll time of once.

After changing the scroll time as described above, the authoring section 10 detects the same and updates the information file. Also, the authoring section 10 changes the size of the marker to a×a, and changes the color of the frame boundary line of the frame with frame order 5 to the same color of the other frames.

The frame boundary line may be deleted or added. Since the method to add/delete the frame boundary line is the same as the method in step S4, the description thereof is omitted. For example, in a state a predetermined frame is selected, when a predetermined frame boundary line of the frame is selected by the user through the operation section 12, the selected frame is deleted. For example, when the size of the frame is small and the border F includes two frames, efficient display is possible by using a single frame.

Figure 30:
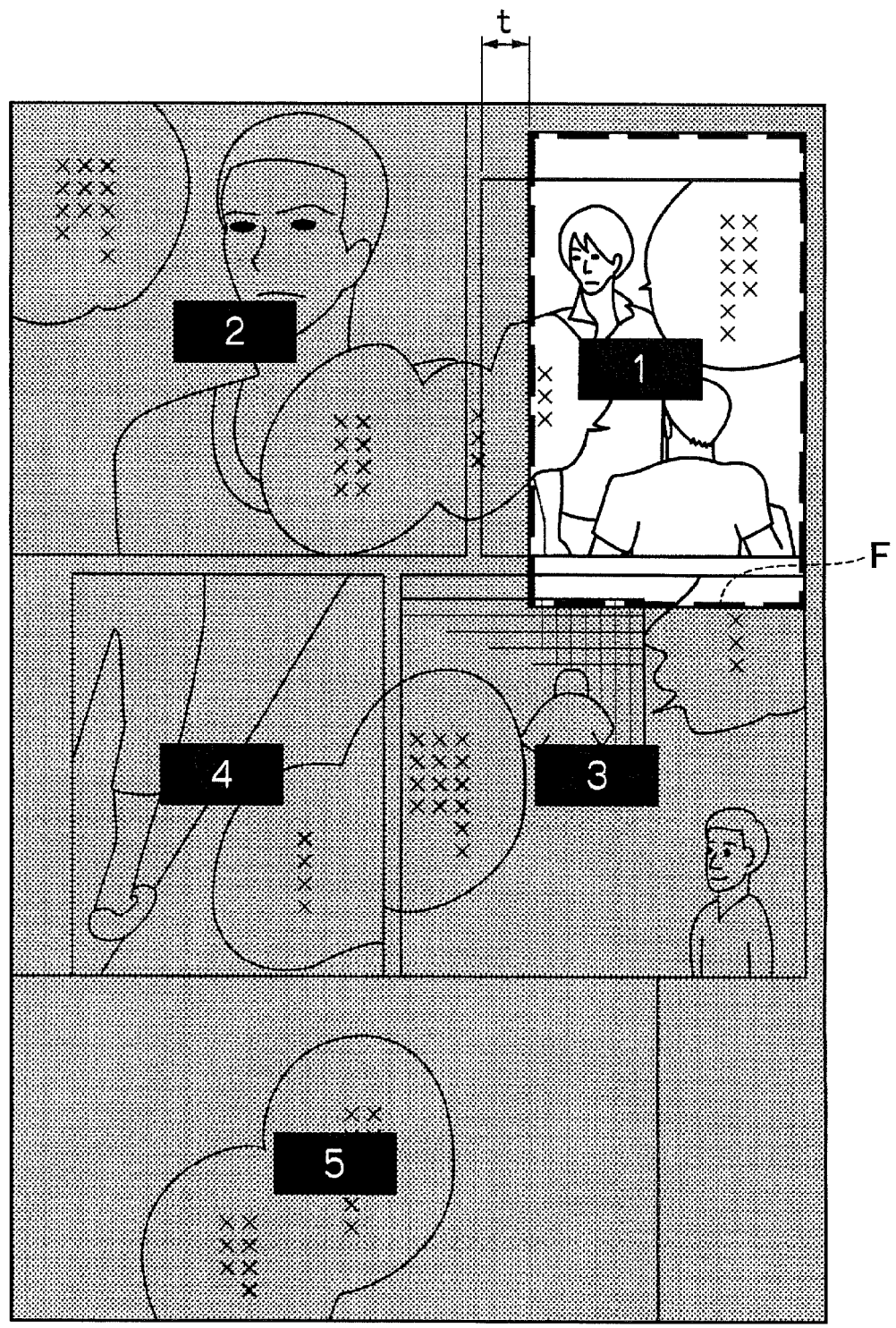
FIG. 30 is an example of a preview screen.

The authoring section 10 is capable of displaying a preview screen on the monitor 15. FIG. 30 illustrates an example of the preview screen. The authoring section 10 displays a content image on the monitor 15 while superimposing the border F representing the screen size of the digital book viewer 2 on the content image. The authoring section 10 translucently covers over the outside of the border F to preview screen which is visible only the inside of the border F. Not only translucently covering over the outside of the border F, the outside of the border F may be covered over with gray color.

When the user gives an instruction through the operation section 12, the authoring section 10 scrolls the border F to display the next preview screen. When any frame is rest without being previewed, the authoring section 10 shifts the border F to show every frame under being previewed to translucently display the outside of the border F so that every frame can be previewed. In the example shown in FIG. 30, the border F is shifted leftward by a distance of "t".

When the preview is completed on every frame under being previewed, the authoring section 10 shift the border F so that the right end of the frame with next frame order aligns with the right end of the border F, and translucently displays the outside of the border F.

With this, the user can check the state of the images on the digital book viewer 2. Accordingly, the master data can be edited more appropriately.

The edition processing of the master data is not limited to the case where the authoring section 10 creates the master data. A master data created by an external digital comic generating device may be stored in the DB 11 of the server 1 and edit the same.

According to the embodiment, master data of the content of a digital comic is created and edited by the delivery server of a digital book. However, as for the apparatus for creating the master data may be a digital comic editor different from the server which delivers the content. The digital comic editor may be configured with a general purpose personal computer in which a digital comic editing program according to the invention is installed via a storing medium storing the same.

The master data which is created and edited as described above is delivered through a server (delivery server) responding to a delivery request from various mobile terminals. In this case, the delivery server acquires a piece of information on the model of the mobile terminal. The master data may be delivered after being processed into the data suitable for browsing by the model (screen size etc); the master data may be delivered without being processed. When the master data is delivered without being processed, the master data has to be converted into the data suitable for the mobile terminal using viewer software at the mobile terminal side before the master data can be browsed. However, the master data includes an information file as described above. The viewer software uses the information described in the information file to display the content on the mobile terminal.

The invention is not limited to the above-described embodiment. Needless to say, various modifications are possible within a range of the spirit of the invention.

What is claimed is:

1. A digital comic editor, comprising:
    a data acquisition device configured to acquire a piece of master data of a digital comic,
    the master data including:
    an image file corresponding to each page of the comic, the image file having a high resolution image of the entire page; and
    an information file corresponding to each page or all pages of the comic, the information file having described therein a piece of frame information including a piece of frame region information of each frame within the page;
    a display control device configured to control display device to display an image thereon based on the image file in the master data acquired by the data acquisition device and to display a frame boundary while superimposing the same on the image based on the frame region information included in the information file in the master data;
    an indication device configured to indicate a position on the image displayed on the display device;
    a frame addition device configured to add a new frame boundary to a position indicated by the indication device;
    a frame deletion device that deletes the frame boundary from the position indicated by the indication device; and an editing device configured to update the frame region information included in the information file based on the frame boundary added by the frame addition device or the frame boundary deleted by the frame deletion device.

2. The digital comic editor according to claim 1, further comprising a frame boundary extraction device configured to, when an arbitrary position on the image is indicated by the indication device, automatically extracts a frame boundary candidate adjacent to the indicated position,
wherein the display control device controls to display the frame boundary candidate extracted by the frame boundary extraction device on the image in a manner distinguishable from other frame boundaries.

3. The digital comic editor according to claim 2, wherein when a frame boundary is indicated by the indication device, the display control device controls to display the indicated frame boundary in a manner distinguishable from other frame boundaries.

4. The digital comic editor according to claim 1, wherein the frame region information on the frame is a piece of coordinate data of each vertex on the polygonal frame boundary enclosing the frame, a piece of vector data representing the frame boundary or a piece of mask data representing a frame region of each frame.

5. The digital comic editor according to claim 4, wherein the frame addition device adds the coordinate data of a vertex at a position on the frame boundary indicated by the indication device.

6. The digital comic editor according to claim 5, wherein when a frame boundary is indicated by the indication device, the display control device controls to display the indicated frame boundary in a manner distinguishable from other frame boundaries.

7. The digital comic editor according to claim 4, wherein the frame deletion device deletes the coordinate data of a vertex from the frame boundary indicated by the indication device.

8. The digital comic editor according to claim 7, wherein when a frame boundary is indicated by the indication device, the display control device controls to display the indicated frame boundary in a manner distinguishable from other frame boundaries.

9. The digital comic editor according to claim 4, wherein when a frame boundary is indicated by the indication device, the display control device controls to display the indicated frame boundary in a manner distinguishable from other frame boundaries.

10. The digital comic editor according to claim 1, further comprising a frame boundary modification device configured to receive an indication input to modify the position or shape of the frame boundary indicated by the indication device and modifies the frame boundary in accordance with the received indication input,
wherein the editing device updates the frame region information included in the information file with the frame boundary modified by the frame boundary modification device.

11. The digital comic editor according to claim 10, wherein when a frame boundary is indicated by the indication device, the display control device controls to display the indicated frame boundary in a manner distinguishable from other frame boundaries.

12. The digital comic editor according to claim 1, wherein the frame information includes a piece of frame order information representing read order of the frames within the page, and the display control device displays a frame order representing a read order of the frames while superimposing the same on each frame on the image based on the frame order information.

13. The digital comic editor according to claim 12, wherein when a frame is added by the frame addition device or when a frame is deleted by the frame deletion device, the editing device edits the frame order information based on the addition or deletion of the frame.

14. The digital comic editor according to claim 12, further comprising a frame order information modification device configured to receive an indication input to modify the frame order of the frame indicated by the indication device and modifies the frame order information in accordance with the received indication input.

15. The digital comic editor according to claim 14, wherein when a frame boundary is indicated by the indication device, the display control device controls to display the indicated frame boundary in a manner distinguishable from other frame boundaries.

16. The digital comic editor according to claim 12, wherein when a frame boundary is indicated by the indication device, the display control device controls to display the indicated frame boundary in a manner distinguishable from other frame boundaries.

17. The digital comic editor according to claim 1, further comprising:
an image acquisition device configured to acquire an image file having a high resolution image of the entire page;
a frame region extraction device configured to analyze the image of the entire page acquired by the image acquisition device and automatically extracts the frame regions of the frames within the page;
an information file creation device configured to create the information file having described therein a piece of frame information including a piece of frame region information representing a frame region extracted by the frame region extraction device; and
a master data creation device configured to create the master data of the digital comic, the master data including the image file of each page of the comic acquired by the image acquisition device and the information file corresponding to each page or all pages of the comic created by the information file creation device,
wherein the data acquisition device acquires the master data created by the master data creation device.

18. The digital comic editor according to claim 1, wherein when a frame boundary is indicated by the indication device, the display control device controls to display the indicated frame boundary in a manner distinguishable from other frame boundaries.

19. A digital comic editing method, comprising the steps of:
a data acquisition step acquiring a piece of master data of a digital comic,
the master data including:
an image file corresponding to each page of the comic, the image file having a high resolution image of the entire page; and
an information file corresponding to each page or all pages of the comic, the information file having described therein a piece of frame information including a piece of frame region information of each frame within the page;
a display control step controlling a display device to display an image thereon based on the image file in the master data acquired in the data acquisition step and to display a frame boundary while superimposing the same on the image based on the frame region information included in the information file in the master data;

an indication step indicating a position on the image displayed on the display device;

a frame addition step adding a new frame boundary to a position indicated in the indication step;

a frame deletion step deleting the frame boundary from the position indicated in the indication step; and an editing step updating the frame region information included in the information file based on the frame added in the frame addition step or the frame deleted in the frame deletion step.

20. A non-transitory computer-readable medium storing a digital comic editing program causing a computer to execute:

a data acquisition step to acquire a piece of master data of a digital comic, the master data including:

an image file corresponding to each page of the comic, the image file having a high resolution image of the entire page; and an information file corresponding to each page or all pages of the comic, the information file having described therein a piece of frame information including a piece of frame region information of each frame within the page;

a display control step to control a display device to display an image thereon based on the image file in the master data acquired by the data acquisition step and to display a frame boundary while superimposing the same on the image based on the frame region information included in the information file in the master data;

an indication step to indicate a position on the image displayed on the display device;

a frame addition step to add a new frame boundary to a position indicated by the indication step;

a frame deletion step to delete the frame boundary from the position indicated by the indication step; and an editing step to update the frame region information included in the information file based on the frame added by the frame addition step or the frame deleted by the frame deletion step.

* * * * *